US012143179B2

(12) United States Patent
Dou et al.

(10) Patent No.: US 12,143,179 B2
(45) Date of Patent: Nov. 12, 2024

(54) TRANSMISSION POWER MANAGEMENT FOR CONCURRENT OPERATING RADIOS

(71) Applicant: Apple Inc., Cupertino, CA (US)

(72) Inventors: Weiping Dou, Cupertino, CA (US); Anthony Wang, San Jose, CA (US); Digvijay Arjunrao Jadhav, San Jose, CA (US); Eric Conor Merkley, San Jose, CA (US); Hailong Yang, San Francisco, CA (US); Indranil S. Sen, Cupertino, CA (US); Madhusudan Chaudhary, Campbell, CA (US); Pengkai Zhao, Cupertino, CA (US); Prashant H. Vashi, San Jose, CA (US); Rajesh Ambati, Los Altos Hills, CA (US); Wen Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 17/351,974

(22) Filed: Jun. 18, 2021

(65) Prior Publication Data

US 2022/0407573 A1 Dec. 22, 2022

(51) Int. Cl.
*H04B 7/06* (2006.01)
*H01Q 21/28* (2006.01)
*H04W 52/28* (2009.01)
*H04W 72/04* (2023.01)
*H04W 72/044* (2023.01)
(Continued)

(52) U.S. Cl.
CPC ........... *H04B 7/0608* (2013.01); *H01Q 21/28* (2013.01); *H04W 52/281* (2013.01); *H04W 72/0473* (2013.01); *H04W 72/566* (2023.01)

(58) Field of Classification Search
CPC .. H04B 7/0608; H04B 7/0689; H04B 7/0691; H01Q 21/28; H04W 52/281; H04W 72/0473; H04W 72/566
See application file for complete search history.

(56) References Cited

U.S. PATENT DOCUMENTS 6,486,835 B1 * 11/2002 Wakeham .............. H01Q 1/244
343/702
8,792,930 B1 * 7/2014 Gopalakrishnan .. H04W 52/228
455/117
(Continued)

FOREIGN PATENT DOCUMENTS

WO 2021042317 A1 3/2021

*Primary Examiner* — Hoang-Chuong Q Vu
(74) *Attorney, Agent, or Firm* — FLETCHER YODER PC

(57) ABSTRACT

A method includes receiving an indication to transmit a first set of signals using a first standard (e.g., Long Term Evolution) via a first set of antennas of a radio frequency device and a second set of signals using a second standard (e.g., New Radio) via a second set of antennas. The method also includes transmitting the first set of signals via the first set of antennas using a first power based on positions of the first set and second set of antennas, exposure conditions of the first set and the second set of signals on a user, and/or priorities of the first and the second set of signals. Moreover, the method includes transmitting the second set of signals via the second set of antennas using a second power based on the positions of the antennas, the exposure conditions of the signals on the user, and/or priorities of the signals.

20 Claims, 10 Drawing Sheets

(51) Int. Cl.
    *H04W 72/12*         (2023.01)
    *H04W 72/566*      (2023.01)

(56) References Cited

U.S. PATENT DOCUMENTS

| | | | | |
|---|---|---|---|---|
| 8,798,695 | B1* | 8/2014 | Zheng | H01Q 21/28 |
| | | | | 455/575.7 |
| 8,989,792 | B1* | 3/2015 | Depew | H04B 1/3838 |
| | | | | 455/575.4 |
| 9,716,558 | B1* | 7/2017 | Buthler | H04B 17/309 |
| 10,433,280 | B2* | 10/2019 | Warner | H04W 72/02 |
| 2004/0106437 | A1* | 6/2004 | Ylitalo | H04W 52/42 |
| | | | | 342/368 |
| 2011/0237188 | A1* | 9/2011 | Sen | H04B 17/327 |
| | | | | 455/63.3 |
| 2013/0157586 | A1* | 6/2013 | Saito | H04B 1/40 |
| | | | | 455/73 |
| 2015/0163683 | A1* | 6/2015 | Namgoong | H04B 7/06 |
| | | | | 455/562.1 |
| 2016/0204839 | A1* | 7/2016 | Liu | H04W 4/02 |
| | | | | 345/8 |
| 2019/0208420 | A1* | 7/2019 | Lekkas | H04W 4/44 |
| 2019/0215047 | A1* | 7/2019 | Cirkic | H04B 7/0691 |
| 2019/0356349 | A1* | 11/2019 | Lan | H04B 1/3838 |
| 2020/0374074 | A1 | 11/2020 | Qin et al. | |
| 2020/0374882 | A1 | 11/2020 | Cai et al. | |
| 2020/0411960 | A1* | 12/2020 | Ng | H01Q 1/245 |
| 2021/0050669 | A1* | 2/2021 | Cha | H01Q 5/10 |
| 2021/0368384 | A1* | 11/2021 | Bhaskar | H04B 7/0617 |
| 2021/0408671 | A1* | 12/2021 | Kim | H01Q 3/24 |
| 2022/0031172 | A1* | 2/2022 | He | H01Q 9/0428 |
| 2022/0369319 | A1* | 11/2022 | Kumar | H04W 52/346 |
| 2022/0394347 | A1* | 12/2022 | Cheong | H04B 17/318 |

\* cited by examiner

TRANSMISSION POWER MANAGEMENT FOR CONCURRENT OPERATING RADIOS

BACKGROUND

The present disclosure relates generally to wireless communication, and more specifically to managing power when transmitting signals via antennas of a radio frequency (RF) device.

Radio frequency communication devices may send the RF signals at a target frequency or a target range of frequencies at a particular power via one or more antennas to ensure that the RF signals are transmitted and received at their intended destinations. Radio frequency devices may regulate the power emitted from the antennas, for example, based on Federal Communications Commission (FCC) guidelines for human exposure to radiation emitted from the antennas. The FCC may regulate power transmitted from the antennas when a person is in close proximity to a radio frequency device based on a specific absorption rate (SAR) or a maximum permissible exposure (MPE) requirement for radiated electric fields, magnetic fields, and power density.

Often, radio frequency devices may include multiple sets of antennas (e.g., each set including one antenna or multiple antennas). Each of the sets of antennas may transmit signals simultaneously or concurrently at different frequency ranges. However, managing the power used to transmit RF signals at each set of antennas for a particular frequency range may be difficult.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method includes receiving an indication to transmit a first set of signals using a first standard (e.g., Long Term Evolution (LTE)) via a first set of antennas of a radio frequency device and a second set of signals using a second standard (e.g., millimeter wave (mmWave)) via a second set of antennas. The method also includes transmitting the first set of signals via the first set of antennas using a first power based on positions of the first set of antennas and the second set of antennas, exposure conditions of the first set of signals and the second set of signals on a user, and/or priorities of the first set of signals and the second set of signals. Moreover, the method includes transmitting the second set of signals via the second set of antennas using a second power based on the positions of the first set of antennas and the second set of antennas, the exposure conditions of the first set of signals and the second set of signals on the user, and/or the priorities of the first set of signals and the second set of signals.

In another embodiment, a radio frequency device includes a first set of antennas and a second set of antennas, a first transmitter, a second transmitter, and one or more processors communicatively coupled to the first transmitter and the second transmitter. The first transmitter sends transmission signals through the first set of antennas using a first standard and the second transmitter sends transmission signals through the second set of antennas using a second standard different from the first standard. The processors receive an indication to transmit a first set of signals using the first standard via the first set of antennas and receive an indication to transmit a second set of signals using the second standard via the second set of antennas. Moreover, the processors determine a set of distances between each of the first set of antennas and the second set of antennas. In response to determining that each distance of the set of distances is above a threshold distance, the one or more processors cause the first transmitter to transmit the first set of signals via the first set of antennas using a first power, and cause the second transmitter transmit the second set of signals via the second set of antennas using a second power. Additionally, in response to determining that the distance is below the threshold distance, the one or more processors cause the first transmitter to transmit the first set of signals via the first set of antennas using a third power that is less than the first power and cause the second transmitter to transmit the second set of signals via the second set of antennas using a fourth power less than the second power.

In yet another embodiment, a mobile communication device includes a body, a first set of antennas and a second set of antennas disposed in a first portion of the body, and a third set of antennas disposed in a second portion of the body. The mobile communication device also includes a first transmitter that sends transmission signals through the first set of antennas using a first standard, a second transmitter that sends transmission signals through the second set of antennas using a second standard different from the first standard, a third transmitter that sends transmission signals through the third set of antennas using the first standard, and one or more processors communicatively coupled to the first transmitter, the second transmitter, and the third transmitter. The processors receive an indication to transmit a first set of signals using the first standard and to transmit a second set of signals using the second standard. In response to determining there is an obstruction associated with the third set of antennas, the processors cause the first transmitter to transmit the first set of signals via the first set of antennas and cause the second transmitter to transmit the second set of signals. In response to determining there is no obstruction associated with the third set of antennas, the processors cause the third transmitter to transmit the first set of signals via the third set of antennas and cause the second transmitter to transmit the second set of signals.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
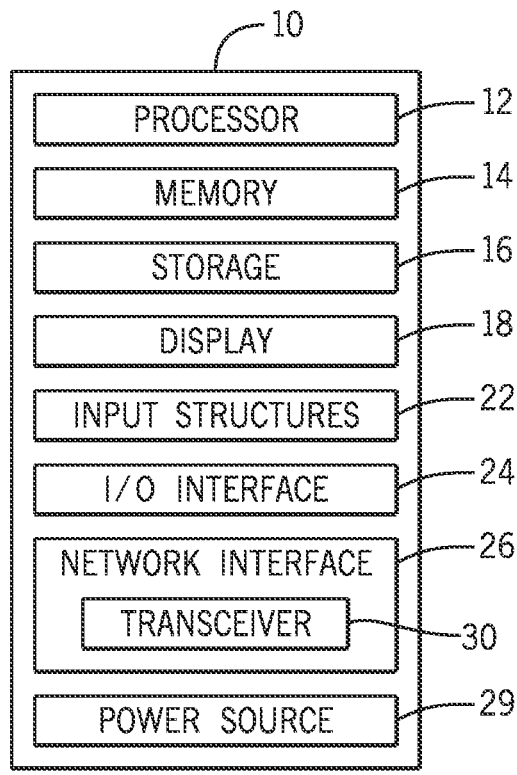
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to managing transmission power at multiple antennas of a radio frequency device. Often, managing transmission power may be based on compliance with federal guidelines. The Federal Communications Commission (FCC) adopted guidelines for evaluating human exposure to radiation emitted from antennas, such as those used in a radio frequency device. In accordance with these guidelines, a radio frequency device may regulate the power transmitted from its antennas, such as when a person is in close proximity to the radio frequency device, based on a maximum permissible exposure (MPE) requirement for radiated electric fields, magnetic fields, and power density. The MPE requirements are derived from a specific absorption rate (SAR) at which tissue absorbs radio frequency energy, usually expressed in watts per kilogram (W/kg). In general, SAR measurements apply to devices that are in close proximity to the human, such as within 20 centimeters (cm), while MPE measurements may apply to devices that are more than 20 cm from the human. In particular, SAR may be used for measuring volumetric absorption (in W/kg) below 6 gigahertz (GHz) and MPE may be used for measuring surface power density (PD) (in $W/m^2$) above 6 GHz. The SAR and MPE regulations vary with frequency and the most stringent requirements are for the fifth-generation new radio (5G NR), which includes the millimeter wave (mmWave) frequency range (e.g., 24 to 100 gigahertz (GHz)) and sub-6 GHz frequency bands, because various human-body resonances fall in this frequency range.

Embodiments herein provide various techniques for managing transmission power at multiple antennas or sets of antennas of a radio frequency device that are simultaneously or concurrently transmitting signals over various frequency ranges. For example, a first set of antennas may transmit signals over a Long Term Evolution (LTE) frequency range (e.g., approximately between 600 megahertz (MHz) and 2.5 GHz) while a second set of antennas may transmit signals over the mmWave frequency range. Although the following descriptions primarily describe managing transmission power at sets of antennas that are transmitting over the LTE frequency range and the mmWave frequency range, which represents a particular embodiment, the transmission power management techniques described herein may additionally or alternatively apply to one or more antennas (e.g., one, two, three, ten, twelve, twenty, fifty, and so forth, of one, two, three, ten, twelve, twenty, fifty, and so forth, of antenna sets) communicating over one or more communication standards (e.g., including LTE, NR, Wi-Fi, Bluetooth®, ultra wideband (UWB), and so forth). Moreover, although the following descriptions describe transmission power management based on FCC guidelines for SAR and/or MPE of signals to a human, which represents a particular embodiment, the transmission power management techniques described herein may also apply to efficiently and precisely selecting antennas or multiple radio access technology (RAT) combinations for efficient performance in free space from the multiple antennas or radios (e.g., sets of antennas of the radio frequency device), and/or other guidelines (e.g., of other geographical regions).

In particular, the techniques described herein may precisely decrease power at a first set of antennas transmitting the signals over the LTE frequency range and for the second set of antennas transmitting signals over the mmWave frequency range, for example, to comply with FCC guidelines for SAR or MPE of the signals to a human. That is, the radio frequency device may decrease power at the first set of antennas by an amount that is based on guidelines for the LTE frequency range when the first set of antennas is in a close proximity (e.g., within a threshold proximity) to a human, which may be different for other simultaneously or concurrently transmitted signals, such as from the second set of antennas transmitting signals over the mmWave frequency range. This may be because the mmWave signals have more stringent guidelines due to the various human-body resonances falling into this frequency range, thus resulting in a greater power decrease to be in compliance with the FCC guidelines.

Specifically, the radio frequency device may apply a first weight to a first initial power for transmitting a first set of signals (e.g., the signals over LTE frequency) via the first set of antennas and a second weight to a second initial power for transmitting a second set of signals (e.g., the signals over mmWave frequency) via the second set of antennas of the radio frequency device. The weights may be based on positions of the first set of antennas and the second set of antennas in the radio frequency device (e.g., collocation of the sets of antennas), exposure conditions of the first set of signals and the second set of signals on a user, and/or priorities of the first set of signals and the second set of signals.

In some embodiments, if the radio frequency device determines that each antenna of the first set of antennas is above a threshold distance (e.g., far away) from each antenna of the second set of antennas (e.g., the first set of antennas are at or near a top of the radio frequency device and the second set of antennas are at or near a bottom of the radio frequency device), the radio frequency device may apply a zero weight. For example, the radio frequency device may apply a zero weight to the second power used to transmit the second set of signals via the second set of antennas, and transmit the first set of signals from the first set of antennas based on applying the zero weight to the second power used to transmit the second set of signals. In some cases, the radio frequency device may transmit the first set of signals with a maximum power (e.g., within a SAR or MPE threshold) as the first power and effectively disregard the second set of antennas when determining the first power (e.g., canceling out the second set of antennas based on the zero weight). Similarly, the radio frequency device may transmit the second set of signals with a maximum power (e.g., within a SAR or MPE threshold) as the second power and effectively disregard the first set of antennas when determining the second power (e.g., canceling out the first set of antennas based on the zero weight).

If the radio frequency device determines that each antenna of the first set of antennas is below a threshold distance from each antenna of the second set of antennas (e.g., the first set of antennas and the second set of antennas are collocated), the radio frequency device may apply non-zero weights to a first power used to transmit the first set of signals via the first set of antennas and a second power used to transmit the second set of signals via the second set of antennas. In some embodiments, if each antenna of the first set of antennas is less than a threshold distance (e.g., close by) from each antenna of the second set of antennas (e.g., the first set of antennas and the second set of antennas are collocated), the radio frequency device may apply a first weight to the first power and a second weight to the second power based on a first priority associated with the first set of signals and a second priority associated with the second set of signals (e.g., LTE set of signals has higher priority than mmWave set of signals). As such, the weighted first and second powers, when the first and second sets of antennas are collocated, may be less than the first power and second powers, respectively, when the first and second sets of antennas are not collocated.

In additional or alternative embodiments, if the radio frequency device determines that the first set of antennas is less than a threshold distance from a user's head (e.g., near or in contact with the user's head), the radio frequency device may select a third set of antennas that are above the threshold distance from the user's head and/or body part (e.g., not near or in contact with the user's head and/or body part) to transmit the first set of signals. That is, the radio frequency device may deactivate the first set of antennas and transmit the first set of signals via the third set of antennas. As such, the radio frequency device may manage power of antennas simultaneously transmitting signals over various communication standards and/or to facilitate compliance with the predetermined FCC guidelines of the SAR and/or MPE of signals to the human head.

In additional or alternative embodiments, if the radio frequency device determines that the first set of antennas is less than a threshold distance from a user's body part (e.g., near or in contact with the user's body part) that is, for example, not the user's head, the radio frequency device may decrease a transmission power of the first set of antennas based on the distance from the user's body part That is, the closer the first set of antennas is to the user's body part, the less the transmission power used, and thus the less radiation emitted by the first set of antennas. This may facilitate meeting FCC guidelines related to emitted radiation and the user's head and/or take into account that the user's head may be more sensitive to radiation than the user's body. As such, the radio frequency device may manage power of one or more antennas simultaneously transmitting signals over various communication standards and/or to facilitate compliance with the predetermined FCC guidelines for the SAR and/or MPE of signals to the human body.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including computer code stored on a computer-readable medium) or a combination of both hardware and software elements. The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may represent a block diagram of any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, software, hardware, or any combination thereof. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein and below.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, New Radio (NR) cellular network, and/or a satellite network, and so on. In particular, the network interface 26 may include, for example, one or more interfaces for using a Release-15 cellular communication standard of the 5G specifications that includes the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. As illustrated, the network interface 26 may include a transceiver 30. In some embodiments, all or portions of the transceiver 30 may be disposed within the processor 12. The transceiver 30 may support transmission and receipt of various wireless signals via one or more antennas (not shown in FIG. 1). In some instances, the transceiver 30 may simultaneously transmit the wireless signals over multiple frequencies. For example, the transceiver 30 may transmit a first set of signals via a first set of antennas over a first frequency range (e.g., an LTE frequency) while also transmitting a second set of signals via second set of antennas over a second frequency range (e.g., a 5G NR frequency, which includes the mmWave frequency range). As will be discussed in detail herein, the electronic device 10 may determine that the first set of antennas and/or the second set of antennas are below a threshold distance from a human and decrease power at the first set of antennas and/or the second set of antennas to comply with FCC guidelines. Specifically, the electronic device 10 may send a back off power signal to the transceiver 30 to correspondingly manage the power at the sets of antennas. The transceiver 30 may attenuate the wireless signals based on the back off power signal prior to transmitting them.

The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device.

Figure 2:
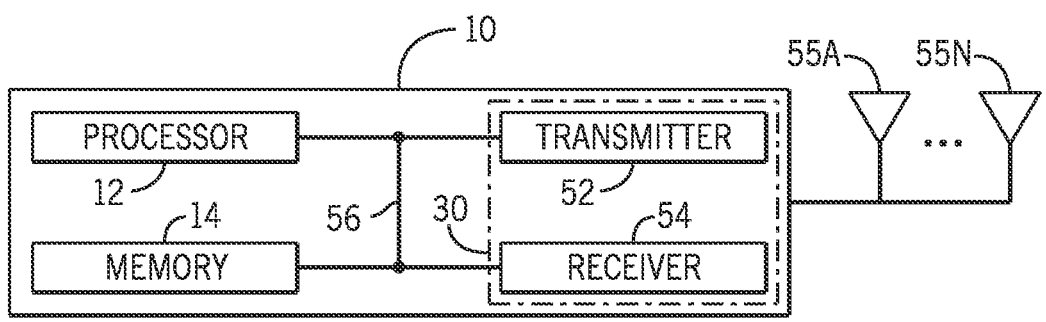
FIG. 2 is a block diagram of a transceiver of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, the transmitter 52, the receiver 54, and/or the antennas 55 (illustrated as 55a-55n) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and a remote location via, for example, a network or direction connection associated with the electronic device 10 and an external transceiver (e.g., in the form of a cell, eNB (E-UTRAN Node B or Evolved Node B), base stations, and the like. As illustrated, the transmitter 52 and the receiver 54 may be combined into the transceiver 30. The electronic device 10 may also have one or more antennas 55a through 55n electrically coupled to the transceiver 30. The antennas 55a-55n may be configured in an omnidirectional or directional configuration, in a single-beam, dual-beam, or multi-beam configuration, and so on. Each antenna 55 may be associated with a one or more beams and various configurations. In some embodiments, each beam, when implemented as multi-beam antennas, may correspond to a respective transceiver 30. The electronic device 10 may include (not shown) multiple transmitters, multiple receivers, multiple transceivers, and/or multiple antennas 55 as suitable for various communication standards. In particular, the antennas 55 may include one antenna each that is used to perform LTE transmission and reception, which may be communicatively coupled to a respective LTE transceiver 30. The antennas 55 may also include antenna arrays, which include multiple antennas 55 (e.g., two or more antennas, such as two antennas, four antennas, eight antennas, sixteen antennas, and so on) that emit signals that constructively and destructively combine to form directional beams.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

As mentioned above, the transceiver 30 of the electronic device 10 may include a transmitter and a receiver that are coupled to at least one or more antennas 55 (e.g., sets of antennas) to enable the electronic device 10 to transmit and receive wireless signals. The electronic device 10 may execute a transmission power management algorithm (e.g., stored in the memory 14 and processed by the processor 12) to manage the power applied to the antennas 55 coupled to the transceiver 30, such that the power applied to the wireless signals from the respective sets of antennas may be adjusted. As will be discussed in detail herein, the electronic device 10 may manage the power based on FCC guidelines associated with SAR and/or MPE of signals to a human. As previously mentioned, the MPE may be based on radiant exposure to skin without causing biological damage and the radiation permitted may vary based on the frequency range.

Since the transceiver 30 may simultaneously or concurrently transmit from multiple sets of antennas, over multiple frequency ranges, the electronic device 10 may determine an amount to decrease the power at each of the multiple sets of antennas to comply with the FCC guidelines. In general, the FCC guidelines may be based on a total ratio summation of SAR or MPE for all transmitted signals (e.g., from each of the antennas 55 or sets of antennas) transmitted close (e.g., within a threshold proximity) to a human. In particular, the FCC guidelines may be met by ensuring that a total ratio summation of measured emitted radiation of wireless signals to the threshold SAR and/or MPE is less than or equal to 1.0. As will be described herein, the electronic device 10 may adjust the power at each of the multiple sets of antennas by applying a respective weight to the sets of antennas. The weights may be based on positions of the multiple sets of antennas in the radio frequency device (e.g., proximity of a first set of antennas to a second set of antennas), exposure conditions of a first set of signals from the first set of antennas and a second set of signals from the second set of antennas on a user, and/or priorities of the first set of signals and the second signals.

Figure 3:
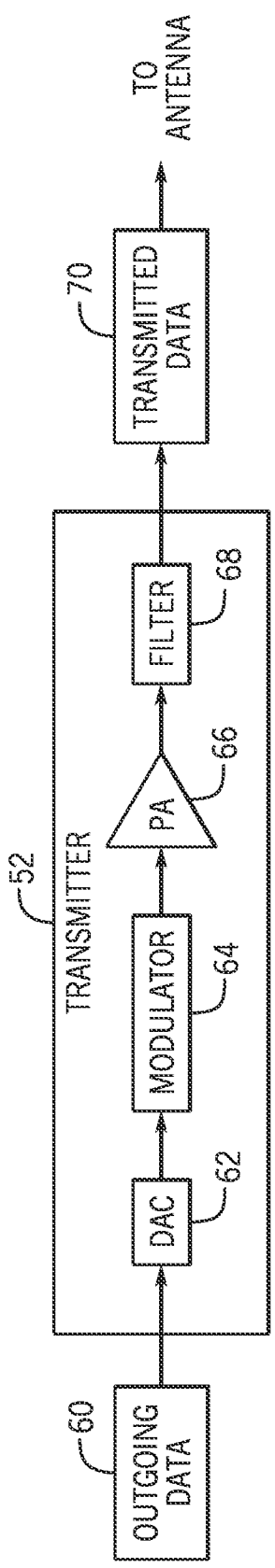
FIG. 3 is a schematic diagram of a transmitter of the transceiver of FIG. 2, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55, which may make up one or more sets of antennas. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 may receive the modulated signal from the modulator 64. The power amplifier 66 may amplify the modulated signal to a suitable level to drive transmission of the signal via the antennas 55. As previously discussed, the electronic device 10 may decrease the power at the antennas 55 to comply with FCC guidelines. In particular, the electronic device 10 may control the power amplifier 66 to decrease (or increase) when transmitting RF signals using at the antennas 55.

A filter 68 (e.g., filter circuitry and/or software) of the transmitter 52 may then remove undesirable noise from the amplified signal to generate transmitted data 70 to be transmitted via the antennas 55. The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components, such that the transmitter 52 may transmit the outgoing data 60 via the antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

In additional or alternative embodiments, the filter 68 may attenuate the modulated signal to decrease the power and reduce the strength of the signal before transmission from the antennas 55. By way of example, the filter 68 may include a low pass filter to pass signals transmitted over a particular low frequency threshold while attenuating signals above the particular low frequency. In some embodiments, the transmitter 52 may include attenuating components to attenuate the modulated signal, such as by using passive (e.g., resistive elements) or active circuits (e.g., inverting operational amplifier attenuator, a differential operational amplifier, etc.).

Figure 4:
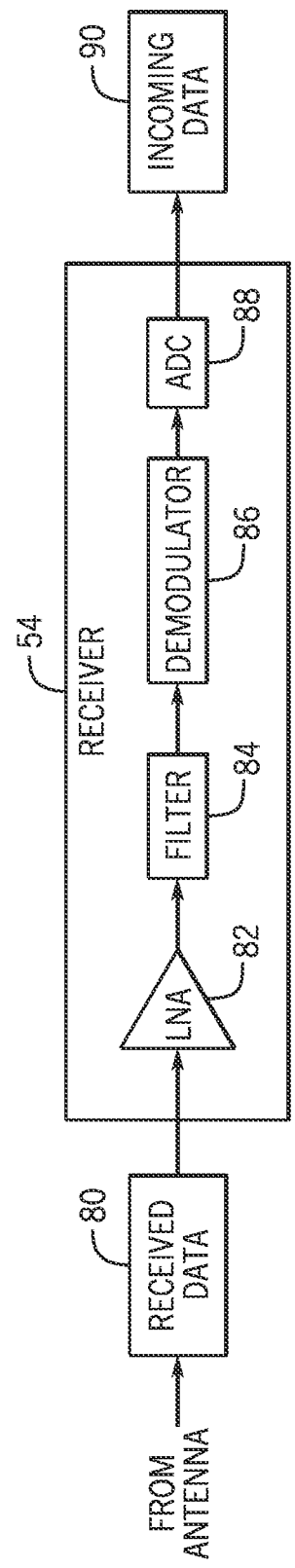
FIG. 4 is a schematic diagram of a receiver of the transceiver of FIG. 2, according to embodiments of the present disclosure.

FIG. 4 is a schematic diagram of the receiver 54 (e.g., receive circuitry), according to embodiments of the present disclosure. As illustrated, the receiver 54 may receive received data 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise, such as cross-channel interference, from the received signal. The filter 84 may also remove additional signals received by the antennas 55 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the electronic device 10. Additionally, the receiver 54 may include any suitable additional components not shown, or may not include certain of the illustrated components, such that the receiver 54 may receive the received data 80 via the one or more antennas 55. For example, the receiver 54 may include a mixer and/or a digital down converter.

Figure 5:
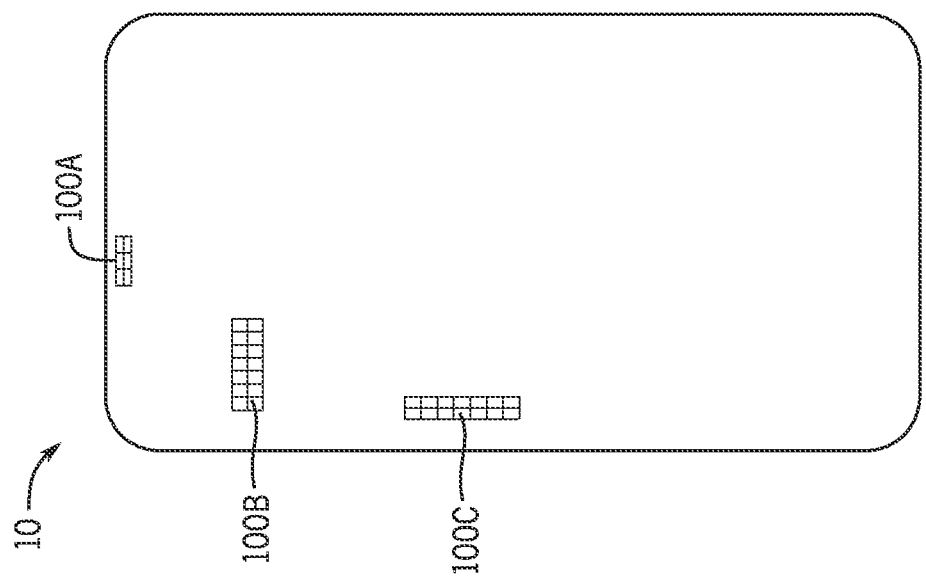
FIG. 5 is a schematic diagram of antenna arrays of a handheld device representing an embodiment of the electronic device of FIG. 1, according to embodiments of the present disclosure.

FIG. 5 is a schematic diagram of antenna array 100 of a handheld device representing an embodiment of the electronic device 10 of FIG. 1, according to embodiments of the present disclosure. In the depicted embodiment, the electronic device 10 may include a first antenna array 100A, a second antenna array 100B, and a third antenna array 100C. Although the following descriptions describe three antenna arrays 100A-C, which represents a particular embodiment, the system-in-package of the electronic device 10 may include any suitable number (e.g., one, three, five, ten, twelve, and so forth) of antenna arrays 100 with multiple antennas 55.

As shown in the current embodiment, the first antenna array 100A may be disposed at a top (e.g., near a top edge when the electronic devices 10 is held in a portrait orientation) and/or front (e.g., near a front surface having the display 18) of the electronic device 10. The second antenna array 100B may be disposed at a backside (e.g., near a back surface not having the display 18) of the electronic device 10. The third antenna array 100C may be disposed at a side of the electronic device 10 (e.g., near a side edge when the electronic devices 10 is held in a portrait orientation). In particular, the first and second antenna arrays 100A, 100B are disposed in a first (e.g., upper) portion of the electronic device 10, while the third antenna array 100C is disposed in a second (e.g., middle) portion of the electronic device 10. Each of the antenna arrays 100 may include multiple antennas 55 that may emit signals to constructively and destructively combine to form directional beams. That is, each of the antennas 55 of an antenna array 100 may transmit wireless signals contributing to a beamformed signal communicated in a direction at a frequency, such as a mmWave range frequency. Although the descriptions describe the antennas 55 of the antenna arrays 100 as communicating over mmWave range frequencies, which represents a particular embodiment, the antennas 55 may additionally or alternatively communicate over other frequencies (e.g., LTE, UWB, Wi-Fi, Bluetooth).

Figure 6:
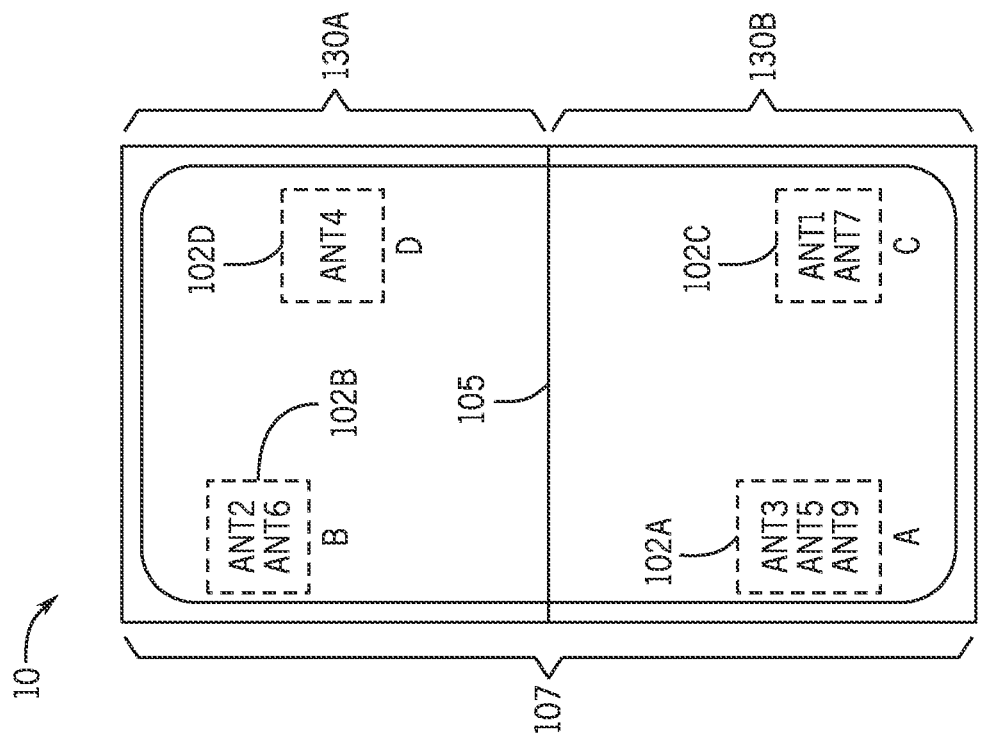
FIG. 6 is a schematic diagram of antenna clusters of the handheld device of FIG. 5, according to embodiments of the present disclosure.

FIG. 6 is a schematic diagram of antenna clusters 102 of the handheld device representing an embodiment of the electronic device 10, according to embodiments of the present disclosures. As shown, the electronic device may include a first antenna cluster 102A that includes three antennas 55 (e.g., antenna 3, antenna 5, and antenna 9) located in bottom left portion of the electronic device 10 (e.g., when the electronic devices 10 is held in a portrait orientation), a second antenna cluster 102B that includes two antennas 55 (e.g., antenna 2 and antenna 6) located in upper left portion of the electronic device 10 (e.g., when the electronic devices 10 is held in a portrait orientation), a third antenna cluster 102C that includes two antennas 55 (e.g., antenna 1 and antenna 7) located in bottom right portion of the electronic device 10 (e.g., when the electronic devices 10 is held in a portrait orientation), and a fourth antenna cluster 102D that includes a single antenna 55 (e.g., antenna 4) located in upper right portion of the electronic device 10 (e.g., when the electronic devices 10 is held in a portrait orientation). Although the following descriptions describe four antenna clusters 102 of the electronic device 10 that transmit signals over the LTE frequency range, which represents a particular embodiment, the electronic device 10 may additionally or alternatively include one or more antenna clusters 102 (e.g., one, five, ten, etc.) with one or more antennas 55. In additional or alternative embodiments, the electronic device 10 may include a single antenna 55 of a cluster 102 that may transmit the signals over different frequency ranges using different polarities (e.g., a first frequency range using a horizontal antenna polarity and a second frequency range using a vertical antenna polarity).

The antenna clusters 102 may be disposed at different locations of electronic device. In some embodiments, the antenna clusters 102 disposed at particular locations may be preferred antennas clusters 102 and/or dedicated antenna clusters 102 for communicating the wireless signals over a particular range of frequencies. For example, the antennas 55 of the first and third antenna clusters 102A and 102C disposed at a bottom portion 103B (e.g., lower portion) of a body or a physical structure 107 of the electronic device 10 (e.g., near a bottom edge of the body 107 when the electronic device 10 is held in a portrait orientation, below a center line 105 of the body 107) may be the preferred antenna clusters 102 for transmitting the wireless signals over a particular frequency. The second and fourth antenna clusters 102B and 102D disposed at a top portion 103A (e.g., upper portion) of the body 107 of the electronic device 10 (e.g., near a top edge of the body 107 when the electronic device 10 is held in a portrait orientation, above a center line 105 of the body 107) may be secondary antenna clusters 102 for transmitting wireless signals over a specific frequency. By way of example, the antenna clusters 102 may transmit the wireless signals over the LTE frequencies and the antenna arrays 100 of FIG. 5 may transmit over mmWave frequencies, as discussed with respect to FIG. 5.

In the depicted embodiment, the electronic device 10 may prefer to transmit the wireless signals over LTE frequencies using antenna clusters 102 that are disposed at a lower or bottom portion 103B of the electronic device 10 (e.g., 102A, 102C) since they do not overlap with the antenna arrays 100 that simultaneously or concurrently transmit wireless signals over the mmWave frequencies (e.g., 100A-C). That is, to decrease radiation that may be absorbed by the user and/or prevent interference between the simultaneously transmitted wireless signals, the electronic device 10 may prefer using certain antennas 55, antenna arrays 100, and/or antenna clusters 102 during simultaneous or concurrent transmission of wireless signals that are transmitted over multiple frequencies.

By way of example and as previously discussed, one or more of antennas 55 of an antenna cluster 102 may transmit wireless signals over a particular LTE frequency while one or more antennas 55 of an antenna array 100 may transmit wireless signals over a particular mmWave frequency. In some embodiments, the electronic device 10 may manage transmission power at the antennas 55 based on an indication that the electronic device 10 may be proximate to a human and may not comply with FCC guidelines. As previously discussed, the electronic device 10 may manage the power at each of the antennas 55 for transmitting the wireless signals, such as by increasing or decreasing the power at the antennas 55 for transmitting the signals. For example, the electronic device 10 may decrease the power at the antennas 55 based on a SAR and/or a MPE from the FCC guidelines. The FCC guidelines may be based on exposure from transmitted signals from the electronic device 10 (e.g., the simultaneously transmitted wireless signals from the antenna arrays 100 and/or the antenna clusters 102). As will be discussed in detail with respect to the FIGS. 8-10, the location of the transmitting antennas 55 within and external to the electronic device 10, may be a factor when regulating the power.

In some embodiments, an object may intrude a path for transmitting signals via the one or more antennas 55 of the electronic device 10. That is, the antennas 55 may be blocked by an object, resulting in signal loss. In this manner, the electronic device 10 may not be able to transmit the wireless signals with the intended power and/or in the intended direction. Although the following descriptions describe transmission power management techniques that include adjusting power based on FCC guidelines, such as for a SAR and/or a MPE of the wireless signals to a human, which represents a particular embodiment, the transmission power management techniques described herein may also apply to efficiently and precisely selecting antennas 55 or RAT combinations for efficient performance in free space from multiple radios (e.g., sets of antennas of the radio frequency device).

In some cases, a user holding the electronic device 10 may block one or more antennas 55 of the antenna clusters 102. By way of example, a hand of the user may cover the first antenna cluster 102A and the third antenna cluster 102C at the bottom portion 103B of the electronic device 10 while holding the electronic device 10 up to an ear of the user and/or using it with the speaker. As will be discussed herein, the electronic device 10 may manage power at the antennas 55 that are simultaneously or concurrently transmitting the wireless signals over different frequency ranges based on a clear or blocked transmission paths from the antennas 55. Additionally or alternatively, and as will be discussed with respect to FIGS. 8-12, the electronic device 10 may manage power based on positions of the antennas 55 transmitting over the different frequency ranges, exposure conditions of the wireless signals on the user, and/or priorities associated with the wireless signals.

Figure 7:
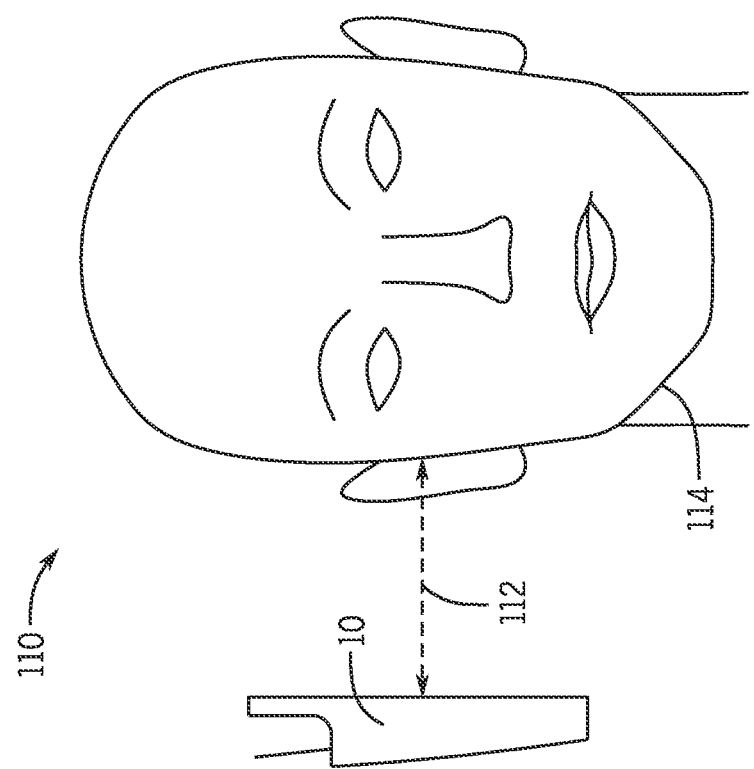
FIG. 7 is a block diagram of antenna radiation from the handheld device and its effect on a user's head, according to embodiments of the present disclosure.

FIG. 7 is a block diagram of antenna radiation 110 from the handheld electronic device 10 and its effect on a user's head, according to embodiments of the present disclosure. Here, the electronic device 10 is near the user at an exposure distance 112 from ahead 114 of the user. Some of the transmission power management techniques applied by the systems and methods described herein, and as discussed in detail with respect to FIG. 12, may be triggered based on the exposure distance 112 and FCC guidelines (e.g. a SAR and an MPE of the wireless signals to the head). That is, the antenna systems and methods for transmission power management described herein may involve adjusting (e.g., decreasing or increasing) the power of the antennas 55 of the antenna sets (e.g., one or more antennas 55, one or more antenna arrays 100, and/or one or more antennas clusters 102) that may transmit or are transmitting the wireless signals simultaneously or concurrently when the antennas 55 are not within a permissible exposure range from the head 114. Although the following descriptions describe the exposure distance 112 with respect to the head 114, the system and methods described herein may also apply to a distance between the antennas 55 and eyes, mouth, ears, nose, and/or other body parts, of a human (e.g., the user or another human).

Figure 8:
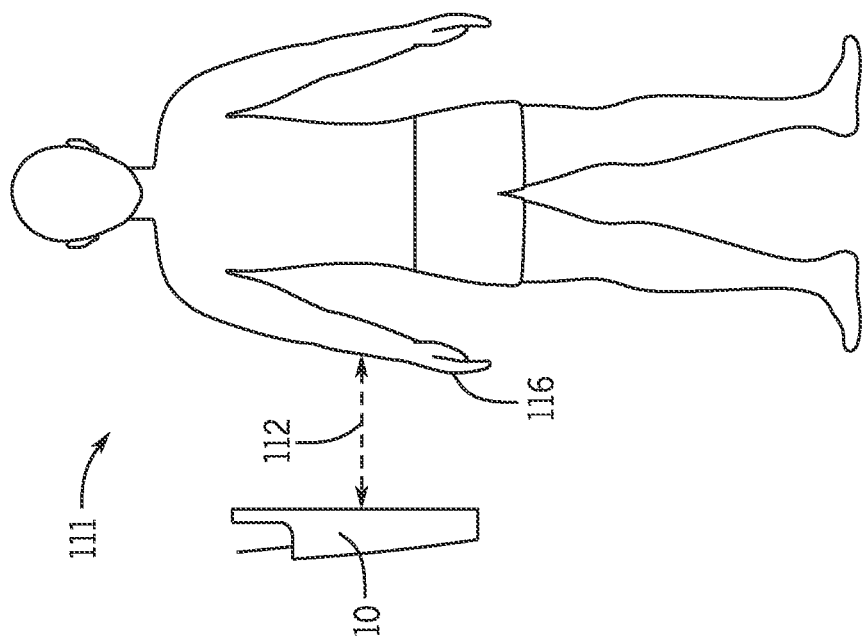
FIG. 8 is a block diagram of antenna radiation from the handheld device and its effect on a user's body, according to embodiments of the present disclosure.

FIG. 8 is a block diagram of antenna radiation 111 from the handheld electronic device 10 and its effect on a user's body, according to embodiments of the present disclosure. In the depicted embodiment, the electronic device 10 is at an exposure distance 112 from a body part 116 of the user. Although the current embodiment depicts a hand as the body part 116, representing a particular embodiment, the systems and methods described herein may apply to other body parts, such as feet, arm, leg, abdomen, ear, neck, and so forth. Some of the transmission power management techniques applied by the systems and methods described herein, and as discussed in detail with respect to FIG. 12, may be triggered based on the exposure distance 112 and FCC guidelines (e.g. a SAR and an MPE of the wireless signals to the head). That is, the antenna systems and methods for transmission power management described herein may involve adjusting (e.g., decreasing or increasing) the power of the antennas 55 of sets of antennas (e.g., one or more antennas 55, one or more antenna arrays 100, and/or one or more antennas clusters 102) that may transmit or are transmitting the wireless signals simultaneously or concurrently when the antennas 55 are not within a permissible exposure range from the body part 16.

Generally, the FCC guidelines specify a threshold human absorption value (e.g., based on SAR and/or MPE) for radiation emitted by wireless signals. These FCC guidelines may be met by ensuring that a total ratio of measured emitted radiation of wireless signals to the threshold SAR and/or MPE is less than or equal to 1.0. The electronic device 10 may simultaneously or concurrently transmit sets of signals (e.g., one, two, three, etc., set of wireless signals). By way of example, the electronic device 10 may transmit a first set of signals over an LTE frequency range via a first set of antennas 55 (e.g., an antenna 55) and transmit a second set of signals over a mmWave frequency range via a second set of antennas 55 (e.g., an antenna array 100). As previously mentioned, SAR limits generally apply to electronic devices 10 in close proximity to a human (e.g., within 20 cm) and cover the frequency range of 100 KHz to 6 GHz. The MPE limits generally apply to electronic devices 10 that are at a distance greater than 20 cm from the human and cover the frequency range of up to 100 GHz. As such, the SAR limits may apply to the LTE frequency range of the first set of signals and the MPE limits may apply to the mmWave frequency range of the second set of signals. In this example, the total ratio summation includes the radiation from both the first set of signals and the second set of signals, and the total ratio summation of both sets of signals should be less than or equal to 1.0 to comply with the FCC guideline (e.g., for the SAR and/or MPE thresholds for the frequency ranges).

The total ratio summation may be described by the following equation:

$$\sum_i \frac{\frac{1}{T_{SAR}} \int_{t-T_{SAR}}^{t} SAR(t)\,dt}{FCC\ SAR\ \text{limit}} +$$

$$\sum_j \frac{\frac{1}{T_{PD}} \int_{t-T_{PD}}^{t} 4\,cm^2\ PD(t)\,dt}{FCC\ PD\ \text{limit}} \leq 1 \qquad \text{(Equation 1)}$$

In this equation, the first summation (e.g., left side of equation) corresponds to the SAR measurement and the second summation (e.g., right side of equation) corresponds to the MPE measurement. The PD corresponds to power density in watts per square meter (W/m$^2$), the $T_{SAR}$ corresponds to a length of a time-averaging window for the SAR calculation, the $T_{PD}$ corresponds to a length of a time-averaging window for the MPE calculation, the t corresponds to the time, the limits correspond to FCC limits, and the cm is centimeters. The first summation provides the sum of the highest measured or estimated SAR for each antenna configuration of the antennas 55, adjusted for a minimum tune-up tolerance, divided by 1.6 W/kg. The first summation is summed with the second summation, which provides a sum of the SAR and/or MPE ratios for each of the antennas 55. The sum of the first summation and the second summation should be equal to or less than 1.0 to comply with FCC guidelines. To summarize, the mathematical Equation 1 may be translated to: [Σ of (the highest measured or estimated SAR for each standalone antenna configuration, adjusted for maximum tune-up tolerance)/1.6 W/kg]+[Σ of MPE ratios] is ≤1.0.

Often, the first set of antennas 55 that are transmitting the first set of signals are disposed in a different portion of the electronic device 10 than the second set of antennas 55 that are transmitting the second set of signals, such that the first set of antennas and the second set of antennas are not collocated. Sometimes, the first set of antennas are disposed near the second set of antennas, such that the collocation of the sets of antennas may increase radiation emitted by the antennas and/or cause interference between the simultaneously or concurrently transmitted first set of signals and the second set of signals. The system and methods described herein prioritize a first set of antennas 55 over the second set of antennas 55 to transmit prioritized signals from the prioritized set of antennas 55 (e.g., when the first set of antennas 55 and the second set of antennas 55 are collocated). That is, the system and methods described herein may prioritize sets of antennas based on the collocation of sets of antennas 55, as well as other factors, such as exposure conditions of the signals from the sets of antennas on a user, and/or priorities of the signals from the sets of antennas. To prioritize the set of antennas 55 over other sets of antennas 55, the system and methods described herein apply a weight to an initial power at the sets of antennas. The weights facilitate the prioritization while maintaining the total ratio summation of the radiation from the wireless signals from the sets of antennas as equal to or less than 1.0 to decrease radiation that may be absorbed by the user and/or prevent interference between the simultaneously transmitted wireless signals. The weighted total ratio summation may be described by the following equation:

$$\sum_{i=1}^{n} w_i \left\{ \frac{\frac{1}{T_{SAR}} \int_{t-T_{SAR}}^{t} 1\,g\ SAR_i(t)\,dt}{1.6\ W/kg} \right\} + \qquad \text{(Equation 2)}$$

$$\sum_{j=1}^{m} w_j \left\{ \frac{\frac{1}{T_{PD}} \int_{t-T_{PD}}^{t} 4\,cm^2\ PD_j(t)\,dt}{10\ W/m^2} \right\} \leq 1$$

In this equation, the i corresponds to a number of transmitting antennas 55 that transmit in a frequency range of less than 6 GHz (e.g., LTE antennas). The PD corresponds to power density in watts per square meter (W/m$^2$), the W corresponds to a weight, the $T_{SAR}$ corresponds to the length of the time-averaging window for the SAR calculation, and $T_{PD}$ corresponds to the length of the time-averaging window for the MPE calculation. The $T_{SAR}$ and $T_{PD}$ values may vary with different frequency spectrums as defined by the FCC. By way of example, $T_{SAR}$ is 100 seconds for a frequency less than 3 GHz and $T_{PD}$ is 4 seconds for a frequency between 24 GHz and 42 GHz. The i corresponds to a number of antennas 55 and/or antenna clusters 102 of FIG. 6 that transmit signals in the LTE frequency range and/or any other radio access technology, such as Wi-Fi at the 2.4 GHz or 5 GHz band. The j corresponds to antennas 55 and/or antenna arrays 100 of FIG. 5 that transmit signals in the mmWave frequency range or at the frequency range of greater than 6 GHz (e.g., NR antenna arrays). As previously mentioned, the systems and methods described herein describe the first set of antennas as transmitting wireless signals over the LTE frequency and the second set of antennas transmitting wireless signals over the mmWave frequency. However, the systems and methods may also apply to multiple simultaneously or concurrently transmitted wireless signals (e.g., one, two, three, five, and so on, sets of wireless signals) from the multiple antennas 55 and/or antenna arrays 100 over one or more communication standards (e.g., LTE, mmWave, NR, and so on). The communication standards may include, but are not limited to, LTE, 5G NR, UWB, Wi-Fi, and/or Bluetooth.

The weighted total ratio summation may be simplified and described by the following equation.

$$\Sigma_{i=1}^{n} W_i \{R_{SAR\_i}\} + \Sigma_{j=1}^{m} W_j \{R_{PD\_j}\} = K \qquad \text{(Equation 3)}$$

In this equation, which is a simplified version of Equation 2, K is a constant between 0 and 1. The constant K corresponds to the total ratio summation. For simultaneous or concurrent transmission, as long as the total ratio summation remains the same, the weight applied to the absorption ratio, R, for each of the antennas 55 may be varied to balance or prioritize one or more antennas 55 over others (e.g., i antennas over j antennas) to facilitate compliance with FCC guidelines (e.g., associated with a particular SAR and/or MPE).

Additionally or alternatively to applying weights to the initial power, the system and methods described herein may determine proximity to an identified head or other user body part, and adjust power based on the proximity (e.g., distance) to the head or the body part since the known absorption for the head and other body parts vary. In some instances, the system and methods described herein may disable (e.g., apply a zero weight to) a set of antennas at or near the identified head or body part and use a different set of antennas to transmit the wireless signals. As such, the system and methods described herein precisely adjust power for each of the sets of antennas (e.g., first set of antennas transmitting over the LTE frequency and the second set of antennas transmitting over the mmWave frequency) rather than adjusting more than necessary for the particular sets of antennas. For example, the system may minimally decrease power for the first set of antennas transmitting over an LTE frequency range, which has less strict FCC guidelines and may be the preferred mode of transmission, by applying weights (e.g., lower or zero weight applied to the second set of antennas to decrease power) and/or disabling sets of antennas. That is, the system and methods adjust power for the set of antennas transmitting over the LTE frequency based on LTE FCC guidelines rather than adjusting based on the mmWave FCC guidelines when signals over the mmWave are simultaneously transmitted.

Figure 9:
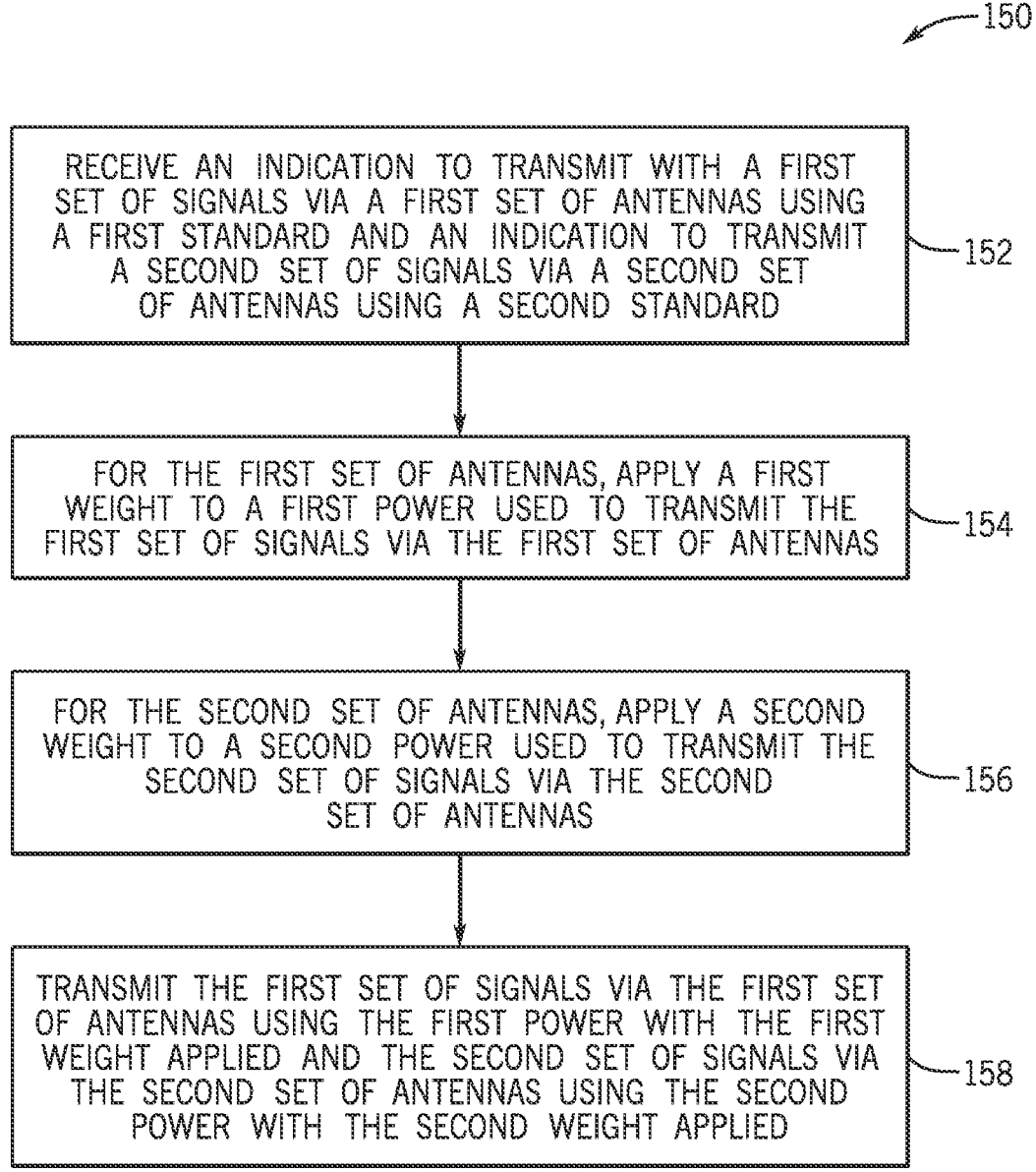
FIG. 9 is a flowchart illustrating a method for managing power for transmitting signals from sets of antennas using weights, according to embodiments of the present disclosure.

FIG. 9 is a flowchart illustrating a method for managing power for transmitting signals from sets of antennas using weights, according to embodiments of the present disclosure. Any suitable device that may control power related components (e.g., power amplifier 66, filter 68, attenuator, and so on) of the transceiver 30, such as the processor 12 (e.g., one or more processors), may perform the method 150. The processor 12 may also perform the methods described with respect to FIGS. 9-13. In some embodiments, the method 150 may be implemented by executing instructions stored in a tangible, non-transitory, computer-readable medium, such as the memory 14 (e.g., one or more memory devices), using the processors 12. The processor 12 of the electronic device 10 may execute instructions to perform the method 150 that are stored in the memory 14 and carried out by the processor 12. While the method 150 is described using steps in a specific sequence, it should be understood that the present disclosure contemplates that the described steps may be performed in different sequences than the sequence illustrated, and certain described steps may be skipped or not performed altogether. Moreover, although the following discussions describe the method 150 implemented for transmitting wireless signals, the method 150 may additionally or alternatively be implemented for receiving the reception signals using the receiver 54, as described with respect to FIG. 4. The method 150 may also apply to any transmission power management environment (e.g., not FCC guideline related), such as for an environment in which certain wireless signals may generally be prioritized over other wireless signals. That is, as previously mentioned, the transmission power management techniques described herein may apply weights to select certain antennas 55 and RAT combinations for better multiple radio coexistence performance in free space.

As shown, at process block 152, the processor 12 may receive an indication to transmit a first set of signals via a first set of antennas (e.g., one or more antennas 55) using a first standard and an indication to transmit a second set of signals via a second set of antennas (e.g., one or more antennas 55) using a second standard. For example, the processor 12 may receive the indication to transmit wireless signals (e.g., the first set of signals) over the LTE frequency standard using the first set of antennas. The processor 12 may also receive the indication to transmit wireless signals (e.g., the second set of signals) over the mmWave range standard using the second set of antennas. The first set of antennas may be disposed at a different portion of the electronic device 10 than the second set of antennas. For example, antennas 55 transmitting the wireless signals over the LTE frequency may include antennas 55 disposed at a lower or bottom portion of the electronic device 10 while the antennas 55 transmitting the wireless signals over the mmWave frequency may include antennas 55 disposed at an upper portion of the electronic device 10.

The first set of signals over the LTE frequency from the first set of antennas and the second set of signals over the mmWave frequency from the second set of antennas may be transmitted with varying power. As will be described with respect to FIGS. 9-11, the first set of signals and the second set of signals may be prioritized based on multiple factors. Generally, to prioritize the first set of signals or the second set of signals, a weight may be applied to an initial power for transmitting the first set of signals and the second set of signals. The weights may be applied in a manner that complies with the FCC guidelines for SAR and MPE of the first and second sets of signals. That is, rather than decreasing the power by a constant or predetermined amount to comply with FCC guidelines, the processor 12 may apply the weights to increase or decrease power at the sets of antennas dynamically (e.g., in real-time or at runtime), such as to decrease the power less for the prioritized set of signals while still maintaining a total ratio summation of equal to or less than 1.0 of the FCC guidelines.

At process block 154, for the first set of antennas, the processor 12 may apply a first weight to a first power used to transmit the first set of signals via the first set of antennas. That is, the processor 12 may adjust the power for transmitting the wireless signals over LTE frequency standard. The weight may be a value between 0 and 1, and may be based on positions of the first set of antennas and the second set of antennas in the radio frequency device (e.g., collocation of the sets of antennas), exposure conditions of the first set of signals and the second set of signals on a user, and/or priorities of the first set of signals and the second set of signals, as will be discussed with respect to FIGS. 10-13. By way of example, if the first set of signals that are transmitted over the LTE frequency have higher priority than the second set of signals that are transmitted over the mmWave frequency, then the first weight may be greater than a second weight applied to a second power used to transmit the second set of signals via the second set of antennas.

Similarly, at process block 156, the processor 12 may apply a second weight to a second power used to transmit the second set of signals via the second set of antennas. The second weight may also be based on positions of the first set of antennas and the second set of antennas in the radio frequency device (e.g., collocation of the sets of antennas), exposure conditions of the first set of signals and the second set of signals on a user, and/or priorities of the first set of signals and the second set of signals, as will be discussed with respect to FIGS. 10-13. Using the example above, the second set of signals that are transmitted over the mmWave frequency may have a lower priority than the first set of signals that are transmitted over the LTE frequency. As such, the second weight may be relatively lower than the first weight. To maintain the total ratio summation at or below 1.0, the lower second weight may be applied to the second power for transmitting the second set of signals over the mmWave frequency.

At process block 158, the processor 12 may transmit the first set of signals via the first set of antennas using the first power with the first weight applied and the second set of signals via the second set of antennas using the second power with the second weight applied. That is, the processor 12 may cause the transceiver 30 to transmit the first set of signals using the LTE frequency standard from the first set of antennas without decreasing or substantially decreasing the first power that would otherwise result without prioritizing the first set of signals. That is, in some instances, the processor 12 may assume that the first set of antennas that are transmitting over the LTE frequency and the second set of antennas that are transmitting over the mmWave frequency are collocated and have collocated hotspots (e.g., placement of the antennas 55 of the sets of antennas in the electronic device 10), such that the processor 12 may decrease the transmission power based on FCC guidelines for the mmWave for both sets of antennas (e.g., not the FCC guidelines for the LTE frequency for the first set of antennas) to comply with the SAR. Decreasing the power for the first set of antennas based on the FCC guidelines for the mmWave to comply with the SAR may result in up to 3 decibel (dB) loss for transmitting the first set of signals from the first set of antennas over the LTE frequency. As such, the systems and methods described herein determine if the first set of antennas that are transmitting over the LTE frequency and the second set of antennas that are transmitting over the mmWave frequency are collocated or not collocated and/or prioritize a set of signals (e.g., the first set of signals from the first set of antennas) over another set of signals (e.g., the second set of signals from the second set of antennas) based on a priority level associated with the respective signals from the sets of antennas.

In the same time frame, the processor 12 may cause the transceiver 30 to transmit the second set of signals using the mmWave frequency standard from the second set of antennas by decreasing the second power. Since the first set of signals are prioritized, such that the first set of signals and the second set of signals do not have equal priority (e.g., 0.5 for each weight for each of the first set of signals and the second set of signals), the weight of the second set of signals is at least less than 0.5. As an example, the processor 12 may prioritize the first set of signals when the radio frequency device makes a voice over network call using the LTE network. In particular, the processor 12 may increase the priority of the first set of signals using the LTE frequency standard to maintain a threshold level of voice quality while decreasing the priority of other communication, including the second set of signals using the mmWave frequency standard. In additional or alternative embodiments, the weights may be set and/or adjusted based on positions of the sets of antennas (e.g., whether the sets of antennas are collocated) and/or exposure conditions of the sets of antennas on the user. In this manner, the method 150 may manage power for transmitting signals from the sets of antennas using weights.

Figure 10:
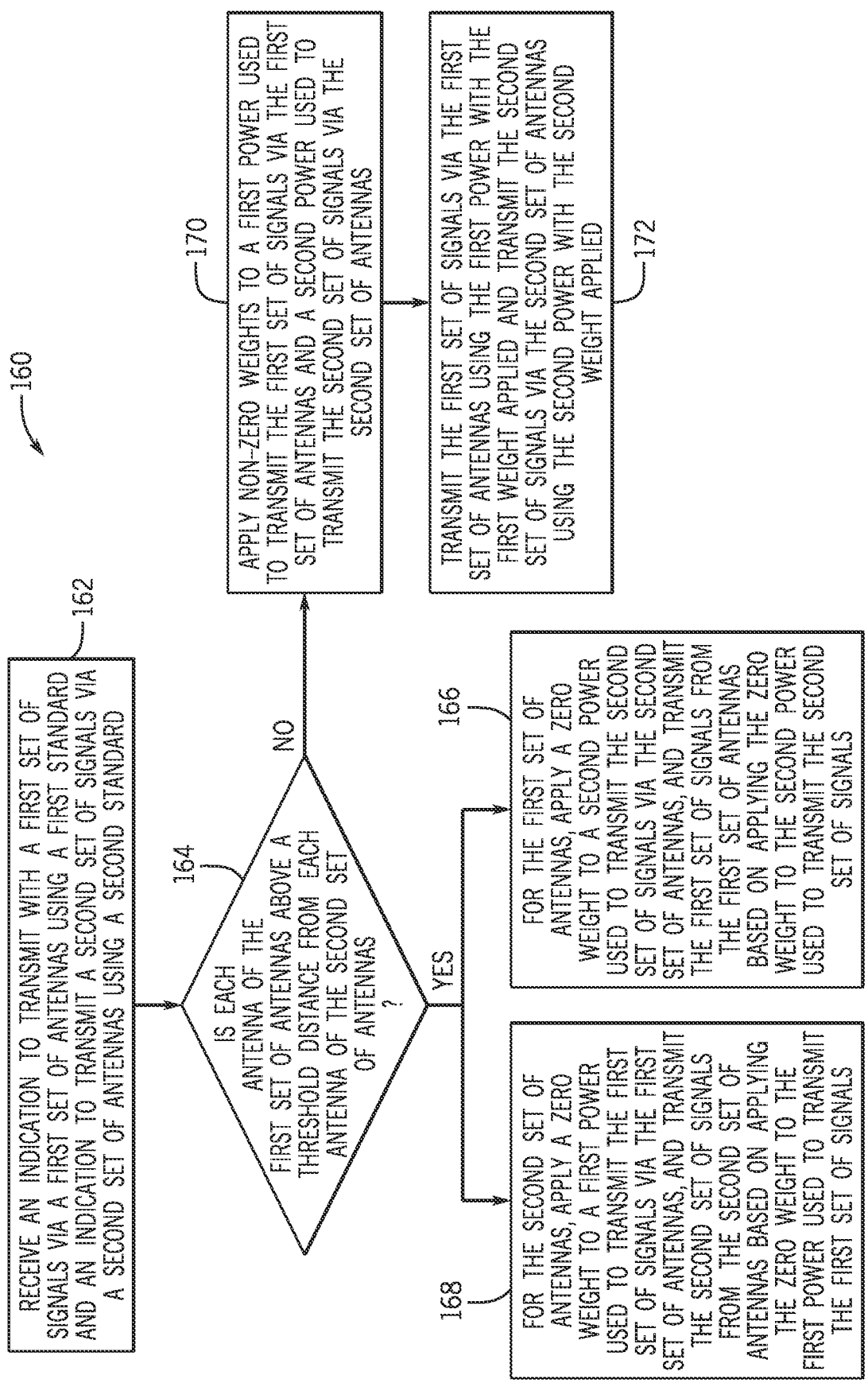
FIG. 10 is a flowchart illustrating a method applying the weights of FIG. 9 to transmission powers based on a threshold distance between the sets of antennas, according to embodiments of the present disclosure.

FIG. 10 is a flowchart illustrating a method 160 applying the weights of FIG. 9 to transmission powers based on positions or a threshold distance between the sets of antennas, according to embodiments of the present disclosure. As shown, at process block 162, the processor 12 may receive an indication to transmit a first set of signals via a first set of antennas using a first standard (e.g., the LTE frequency) and an indication to transmit a second set of signals via a second set of antennas using a second standard (e.g., the mmWave frequency), as described with respect to process block 152 of FIG. 9. That is, the processor 12 may receive an indication to transmit the first set of signals using the LTE frequency standard via the first set of antennas and transmit the second set of signals using the mmWave frequency standard via the second set of antennas.

At decision block 164, the processor 12 may determine whether each antenna 55 of the first set of antennas is above a threshold distance from each antenna 55 of the second set of antennas. That is, the processor 12 may determine if each of the antennas 55 of the first set of antennas transmitting the first set of signals over the LTE frequency are disposed above a threshold distance from (e.g., are not collocated with) each of the antennas 55 of the second set of antennas transmitting the second set of signals over the mmWave frequency. The threshold distance may be any suitable range of distance, such as 4 cm to 20 cm, that reduces radiation caused by the collocation of the sets of antennas (e.g., resulting in radiation above the SAR limit) and/or interference between the first and second sets of signals, such that data throughput from the sets of wireless signals is above an acceptable threshold to prevent delays and performance degradation. The threshold distance may be based on a permissible amount of SAR for each antenna of the first set of antennas and the second set of antennas per FCC guidelines. For example, the FCC provides that the SAR to peak location separation ratio (SPLSR), which is defined as a sum of the SAR for the first set of antennas ($SAR_1$) and the SAR for the second set of antennas ($SAR_2$), taken to the $1.5^{th}$ power, and divided by the distance to the human body, must be less than or equal to 0.04. By way of example, the threshold distance for determining collocation between the first set of antennas that is transmitting over an LTE frequency and the second set of antennas that is transmitting over a mmWave frequency, may be a distance greater than one cm, such as greater than two cm, greater than three cm, greater than five cm, greater than seven cm, and so on. In some embodiments, the threshold distance may be frequency dependent, such that the distance may be based on at least the communication standard used for each of the first set of antennas and the second set of antennas. Additionally or alternatively, it should be understood that the threshold distance may be power dependent, such that the distance may be based on the transmission powers used to transmit the first and second sets of signals.

At process block 166, if each of the antennas 55 of the first set of antennas is disposed above a threshold distance from each of the antennas 55 of the second set of antennas, for the first set of antennas, the processor 12 may apply a zero weight (e.g., zero power) to the second power used to transmit the second set of signals via the second set of antennas, and transmit the first set of signals from the first set of antennas based on applying the zero weight to the second power used to transmit the second set of signals. That is, since the first set of antennas and the second set of antennas are not collocated, the radiation emitted by the first set of antennas may not add to the radiation emitted by the second set of antennas (or may only negligibly add to the radiation emitted by the second set of antennas such that a user may not experience effects of the radiation emitted by the first set of antennas with respect to the radiation emitted by the second set of antennas, and vice versa), and/or the first set of signals may not interfere with (or may only negligibly interfere with the second set of signals such that there is no noticeable signal loss with respect to the second set of signals). As such, the processor 12 may apply a zero weight to the second power to effectively disregard the second set of antennas when determining a weight for the first power while maintaining the total ratio summation equal to or less than 1.0. In particular, the LTE frequency hotspots (e.g., placement of the antennas 55 of the sets of antennas in the electronic device 10) for the first set of signals will not collocate with the mmWave frequency hotspots. For example, when determining the maximum transmission power for transmitting the first set of signals over the LTE frequency, the processor 12 may weigh the contribution from the second set of antennas as a zero weight. Thus, the processor 12 may determine only the SAR measurement associated with the LTE frequency and not the MPE associated with the mm Wave frequency measurement for determining the total ratio summation. The first set of antennas may transmit the first set of signals over the LTE frequency with a maximum power (e.g., weight of 1) under the SAR guidelines.

At process block 168, for the second set of antennas, the processor 12 may apply a zero weight to the first power used to transmit the first set of signals via the first set of antennas, and transmit the second set of signals from the second set of antennas based on applying the zero weight to the first power used to transmit the first set of signals. Since the first set of antennas and the second set of antennas are not collocated, the processor 12 may apply a zero weight to the first power to effectively disregard the first set of antennas when determining a weight for the second power while maintaining the total ratio summation equal to or less than 1.0. Thus, the processor 12 may determine only the MPE measurement associated with the mmWave frequency and not the SAR measurement associated with the LTE frequency measurement for determining the total ratio summation. The second set of antennas may transmit the second set of signals over the mmWave frequency with a maximum power (e.g., weight of 1) under the mmWave MPE guidelines.

However, at process block 170, if each of the antennas 55 of the first set of antennas is not disposed above a threshold distance from each of the 55 of the second set of antennas, the processor 12 may apply non-zero weights between 0 and 1 to a first power for transmitting the first set of signals via the first set of antennas and a second power for transmitting the second set of signals via the second set of antennas. That is, the first set of antennas are collocated with the second set of antennas, causing more radiation resulting in radiation above the SAR limit and/or causing interference between the first set of signals and the second set of signals. As such, the processor 12 may consider both the first power for the first set of antennas and the second power for the second set of antennas when transmitting the signals, for example, to transmit the signals in compliance with FCC guidelines. In particular, the processor 12 may apply weights between 1 and 0 to each of the first power and the second power. In some embodiments, the weight values may be based on a physical distance between hotspots associated with each of the transmitting antennas 55 for each of first set of antennas and the second set of antennas.

At block 172, the processor 12 may transmit the first set of signals via the first set of antennas using the first power with the first weight applied and transmit the second set of signals via the second set of antennas using the second power with the second weight applied. In this manner, the method 160 uses weights applied to power for simultaneously or concurrently transmitted sets of wireless signals from collocated sets of antennas. Applying the weights enables the processor 12 to precisely and efficiently decrease the first power and the second power while maintaining a total ratio summation at or below 1.0. Additionally or alternatively to factoring the collocation of the first set of antennas and the second set of antennas, the processor 12 may determine the weights based on a priority level associated with each of the first set of signals and the second set of signals. In some cases, the processor 12 may determine the weight based on priority levels of the sets of signals only if the respective sets of antennas are collocated.

Figure 11:
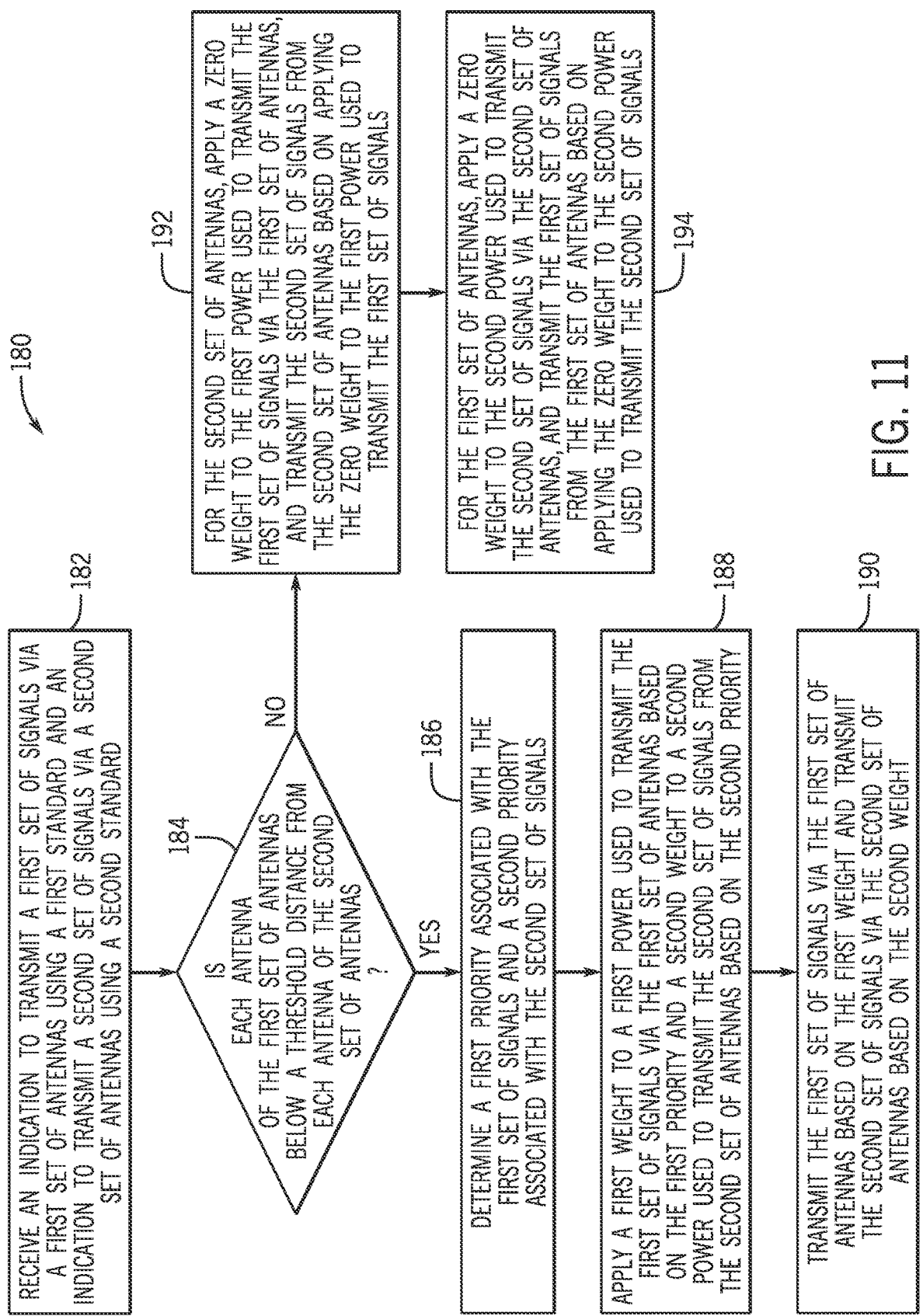
FIG. 11 is a flowchart illustrating a method applying the weights of FIG. 9 to transmission powers based on priorities associated with the signals sent from each of the sets of antennas, according to embodiments of the present disclosure.

To illustrate, FIG. 11 is a flowchart illustrating a method 180 for applying the weights of FIG. 9 to transmission powers based on priorities associated with the signals sent from the sets of antennas, according to embodiments of the present disclosure. At process block 182, the processor 12 may receive an indication to transmit the first set of signals via the first set of antennas using the first standard (e.g., the LTE frequency) and an indication to transmit the second set of signals via the second set of antennas using the second standard (e.g., the mmWave frequency), as described with respect to process block 152 of FIG. 9

At process block 184, the processor 12 may determine whether each antenna 55 of the first set of antennas is below than a threshold distance from each antenna 55 of the second set of antennas. That is, the processor 12 may determine whether the first set of antennas are collocated with the second set of antennas, as discussed with respect to process block 164 of FIG. 10. As previously mentioned, the threshold distance may be a range of distance that reduces radiation caused by the proximity between the sets of antennas (e.g., resulting in radiation above the SAR limit) and/or interference between the first set of signals and the second set of signals, such that data throughput from the sets of wireless signals is above an acceptable threshold to prevent performance degradation.

At process block 186, if each of the antennas 55 of the first set of antennas is below the threshold distance from each of the antennas 55 of the second set of antennas, such that they are collocated, the processor 12 may determine a first priority associated with the first set of signals and a second priority associated with the second set of signals. That is, each of the sets of signals transmitted over their respective communication standard may be associated with a priority level. In some embodiments, the priority may be based on the type of communication (e.g., voice call, video streaming, gaming, downloading, location determining, and so on) associated with each set of signals.

In particular, the processor 12 may prioritize the set of signals when the first set of antennas and the second set of antennas are collocated, in some embodiments. By way of example, a user may make a voice over network call (e.g., voice over network call task), such as a voice over LTE (VoLTE) call. The processor 12 may use lower antennas 55 disposed at the bottom portion 103B of the handheld electronic device 10 (e.g., of FIG. 6) for the first set of antennas to transmit the first set of signals over the LTE frequency. However, the user may hold the handheld electronic device 10 in a manner that blocks the bottom portion 103B. In particular, the user may cover the bottom portion 103B by the user's hand when gripping the handheld electronic device 10. The hand grip may cause reduced signal strength or reduced transmission power when transmitting the first set of signals over the LTE frequency.

As such, the processor 12 may determine not using the blocked antennas 55 (e.g., applying a zero weight to the blocked antennas 55 and/or selecting a different set of antennas). The processor 12 may use the remaining unblocked antennas 55 (e.g., another cluster 102) for transmission and decrease power according to equations 1-3, as previously discussed. The unblocked antennas 55 many include antennas 55 disposed in the top portion 103A of the electronic device 10. Thus, the processor 12 may use some of the antennas 55 in the top portion 103A as the first set of antennas for transmitting the first set of signals over the LTE frequency to avoid signal loss (e.g., data throughput below a threshold throughput). In some instances, the processor 12 may determine using the antennas 55 of the front panel array 100A and/or antennas 55 of an antenna cluster 102 that are collocated with the front panel array 100A to transmit the first set of signals over the LTE frequency. The front panel array 100A may also include the second set of antennas that transmit the second set of signals over the mmWave frequency.

As such, the first set of antennas that transmits the first set of signals over the LTE frequency are collocated with the second set of antennas that transmits the second set of signals over the mmWave frequency. Since the sets of antennas are collocated, the processor 12 may decrease the transmission power at each of the sets of antennas based on the SAR and MPE to maintain a total ratio summation of 1.0. However, the processor 12 may also determine that the first set of signals should be transmitted with a particular power level to provide the VoLTE call above a threshold quality. As such, the processor 12 may prioritize the first set of signals to avoid decreasing the transmission power to a power level that may result in a VoLTE call below the threshold quality.

In particular, the processor 12 may set a higher priority level for the first set of signals transmitted over the LTE frequency to maintain a sufficient voice quality above the threshold quality. The priority level may be associated with a weight, such that higher priority corresponds to a higher weight and a lower priority corresponds to a lower weight. The first set of antennas transmitting over the LTE frequency may be disposed at the top portion 103A of the electronic device 10, as previously discussed. To maintain the total ratio summation at or less than 1.0 based on the SAR and MPE and to transmit the first of signals with enough power to provide the high quality VoLTE call, the second set of antennas that are collocated with the first set of antennas in the top portion 103A may be associated with a lower weight. Thus, the processor 12 may apply a higher weight to the first set of antennas that are transmitting over the LTE frequency while applying a relatively lower weight to the second set of antennas that are transmitting over the mmWave frequency. In this manner, the method 180 that uses weights applied to power and based on a priority level for simultaneously transmitted wireless signals from collocated sets of antennas, enables the processor 12 to prioritize and precisely decrease the first power (e.g., to a power that provides a call quality above the threshold quality) and the second power to a decreased power level while maintaining a total ratio summation at or below 1.0.

As another example, the processor 12 may prioritize the first set of antennas transmitting over the LTE frequency for low data traffic service by raising power weighting factors for one or more antennas 55 of the first set of antennas (e.g., one or more antennas 55 of one or more of the clusters 102 of FIG. 6). On the other hand, the processor 12 may prioritize the second set of antennas transmitting over the mmWave frequency for higher data traffic service by raising the power weighting factors for one or more antennas 55 of the second set of antennas (e.g., one or more antennas 55 of one or more antenna arrays 100 of FIG. 5). Additionally, the processor 12 may prioritize a set of antennas in response to determining that the enabled set of antennas for transmitting the wireless signals over a frequency range are blocked. For example, if the antennas 55 of the first set of antennas are partially or fully blocked (e.g., due to an obstruction, such as a user holding the electronic device 10), the processor 12 may apply a zero weight to the blocked antennas 55, effectively disabling the blocked antennas 55 for transmitting the first set of signals. The processor 12 may use the unblocked antennas 55 for transmitting the first set of signals. As previously discussed, the unblocked antennas 55 may include antennas 55 in the top portion 103A of the electronic device 10. In some instances, the processor 12 may select the set of antennas that is capable of transmitting the first set of signals over the same range of frequencies (e.g., over the LTE frequency) and has the clearest path for transmission. Thus, priority level may be based on but not limited to, position of the simultaneously transmitting sets of antennas (e.g., sets of antennas are collocated), level of data traffic service, and/or task performed by the transmitting sets of antennas (e.g., VoLTE call task).

After determining the priorities, at process block 188, the processor 12 may apply a first weight to the first power used to transmit the first set of signals via the first set of antennas based on the first priority and a second weight to the second power used to transmit the second set of signals from the second set of antennas based on the second priority. That is, the power for the higher priority wireless signals (e.g., higher weight corresponding higher priority) may be increased or decreased less than the power would be if not prioritized, to comply with the SAR and/or the MPE of the wireless signals. The power for the lower priority wireless signals may be decreased more than the power would be if not prioritized with a lower weight, to comply with the SAR and/or the MPE of the wireless signals. That is, in some instances, the processor 12 may assume that the first set of antennas that are transmitting over the LTE frequency and the second set of antennas that are transmitting over the mmWave frequency are collocated and have collocated hotspots (e.g., placement of the antennas 55 of the sets of antennas in the electronic device 10), such that the processor 12 may decrease the transmission power based on FCC guidelines for the mmWave for both sets of antennas (e.g., not the FCC guidelines for the LTE frequency for the first set of antennas) to comply with the SAR. Thus, by prioritizing the first set of signals, the processor 12 may decrease the transmission power less for the prioritized first set of signals rather than automatically decreasing the transmission power to comply with the FCC guidelines for the mmWave, often resulting in a power level below an acceptable threshold to perform the task (e.g., VoLTE call task) associated with the first set of signals.

At block 190, the processor 12 may transmit the first set of signals via the first set of antennas based on the first weight and transmit a second set of signals via a second set of antennas based on the second weight, as discussed with respect to process block 172 of FIG. 10. That is, both the first power and the second power may be weighted to adjust the power level for transmitting the respective sets of signals based on a priority level associated with the sets of signals, so that the total ratio summation is at or below 1.0.

At process block 192, if each of the antennas 55 of the first set of antennas is above the threshold distance from each of the antennas 55 of the second set of antennas, such that they are not collocated, the processor 12 may perform process blocks 166 and 168 of FIG. 10. That is, the processor may apply a zero weight to the second power when transmitting the first set of signals and apply a zero weight to the first power when transmitting the second set of signals.

At process block 194, the processor 12 may transmit the first set of signals via the first set of antennas using the first power with the first weight applied and transmit the second set of signals via the second set of antennas using the second power with the second weight applied, as discussed with respect to block 172 of FIG. 10. In this manner, the method 180 may adjust transmission power based on priorities associated with the signals sent from the sets of antennas. In some embodiments, the electronic device 10 may be close to a head and/or a body part of a human. In such embodiments, the processor 12 may choose to transmit the wireless signals from a different set of antennas than the presently activated set of antennas.

Figure 12:
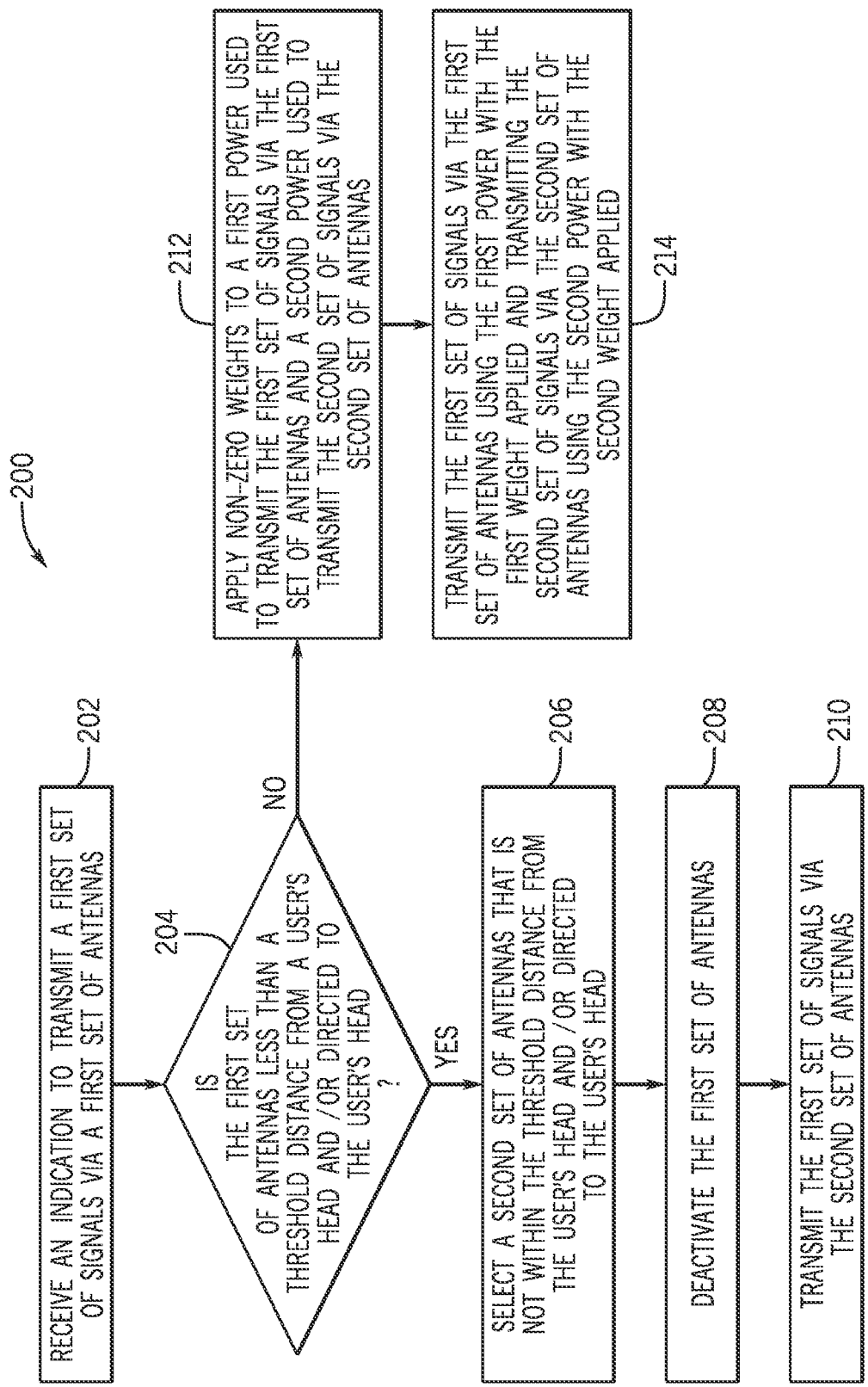
FIG. 12 is a flowchart illustrating a method of deactivating a set of antennas and activating another set of antennas for transmitting signals based on a threshold distance between the handheld device and a head of a user, according to embodiments of the present disclosure.

To illustrate, FIG. 12 is a flowchart illustrating a method 200 of deactivating a set of antennas and activating another set of antennas for transmitting signals based on a threshold distance between the electronic device 10 (e.g., handheld device) and a head or a user, according to embodiments of the present disclosure. At process block 202, the processor 12 may receive an indication to transmit the first set of signals via the first set of antennas. That is, the processor 12 may receive an indication to transmit signals from antennas 55 over a communication standard, such as LTE, 5G NR, Bluetooth, Wi-Fi, and so forth.

At process block 204, the processor 12 may determine whether the first set of antennas is less than a threshold distance from the head and/or directed to the head (e.g., a head position), as discussed with respect to FIG. 7. That is, the processor 12 may determine whether the electronic device 10 is in the head position based on a predetermined distance between the first set of antennas and the head. Specifically, the threshold distance may be a distance in which the first set of antennas should not radiate energy due to absorption by the head (e.g., under FCC guidelines, SAR restrictions, MPE restriction, and so on). As previously discussed, the first set of antennas may include an antenna array 100 of FIG. 5 that transmit signals over the mmWave frequency and is disposed on a portion 103A and/or front side of the electronic device 10. As such, the first set of antennas of an antenna array 100 may likely be positioned in the head position when the user has the electronic device 10 at or near an ear, such as to make a phone call. To detect the distance from the head and/or the direction towards the head, the electronic device 10 may include one or more sensors, which may be integrated with the transceiver 30. The sensors may include, but are not limited to, one or more of proximity sensors, heat sensors, camera sensors, light sensors, facial and/or body recognition sensors with image processing circuitry, and the like.

The first set of antennas transmitting wireless signals over the mmWave may form a beamformed signal, such that the radiated energy may be concentrated along a narrow beam path and more likely be absorbed by the head. As such, irrespective of whether or not the first set of antennas is collocated with another set of antennas, and at process block 206, the processor 12 may select a second set of antennas that is not within the threshold distance from the head and/or directed to the head (e.g., beam direction of the beamformed signal) if the first set of antennas are positioned less than the threshold distance from the head. Thus, the method 200 may apply when the set of antennas are collocated or not collocated with another set of antennas.

At process block 208, the processor 12 may deactivate the first set of antennas. That is, the processor 12 may disable the first set of antennas for transmitting the first set of signals. In some embodiments, the processor 12 may keep the first set of antennas deactivated as long as the first set of antennas are positioned less than the threshold distance from the head. Deactivation may be performed by applying a zero weight to the transmission power used by the first set of antennas. At process block 210, the processor 12 may transmit the set of signals via the second set of antennas. In this manner, the electronic device 10 may continue transmitting the first set of signals, but via the second set of antennas, when the first set of antennas are in the head position while decreasing or preventing radiation absorption by a user's head.

If the first set of antennas is less than a threshold distance from the head and/or directed to the head, the processor 12 may perform process blocks 212 and 214 that correspond to process blocks 170 and 172, as discussed with respect to FIG. 10. That is, the processor 12 may apply non-zero weights to a first power and a second power to transmit the first set of signals and the second set of signals when the transmitting the first set of signals and the second set of signals from collocated sets of antennas. In some embodiments, the sets of antennas may not be collocated and as such, the processor 12 may perform process blocks 166 and 168, as discussed with respect to FIG. 10. In some embodiments, the processor 12 may apply the method 200 to other body parts (e.g., the human body, extremities of the human body, etc.) or other absorptive objects that either absorb or reflect energy from antennas 55, preventing the antennas 55 from transmitting the wireless signals with the intended power and/or radiating in the intended direction. In additional or alternative embodiments, the processor 12 may decrease transmission power of a set of antennas based on a distance the set of antennas is disposed from a user's body part.

Figure 13:
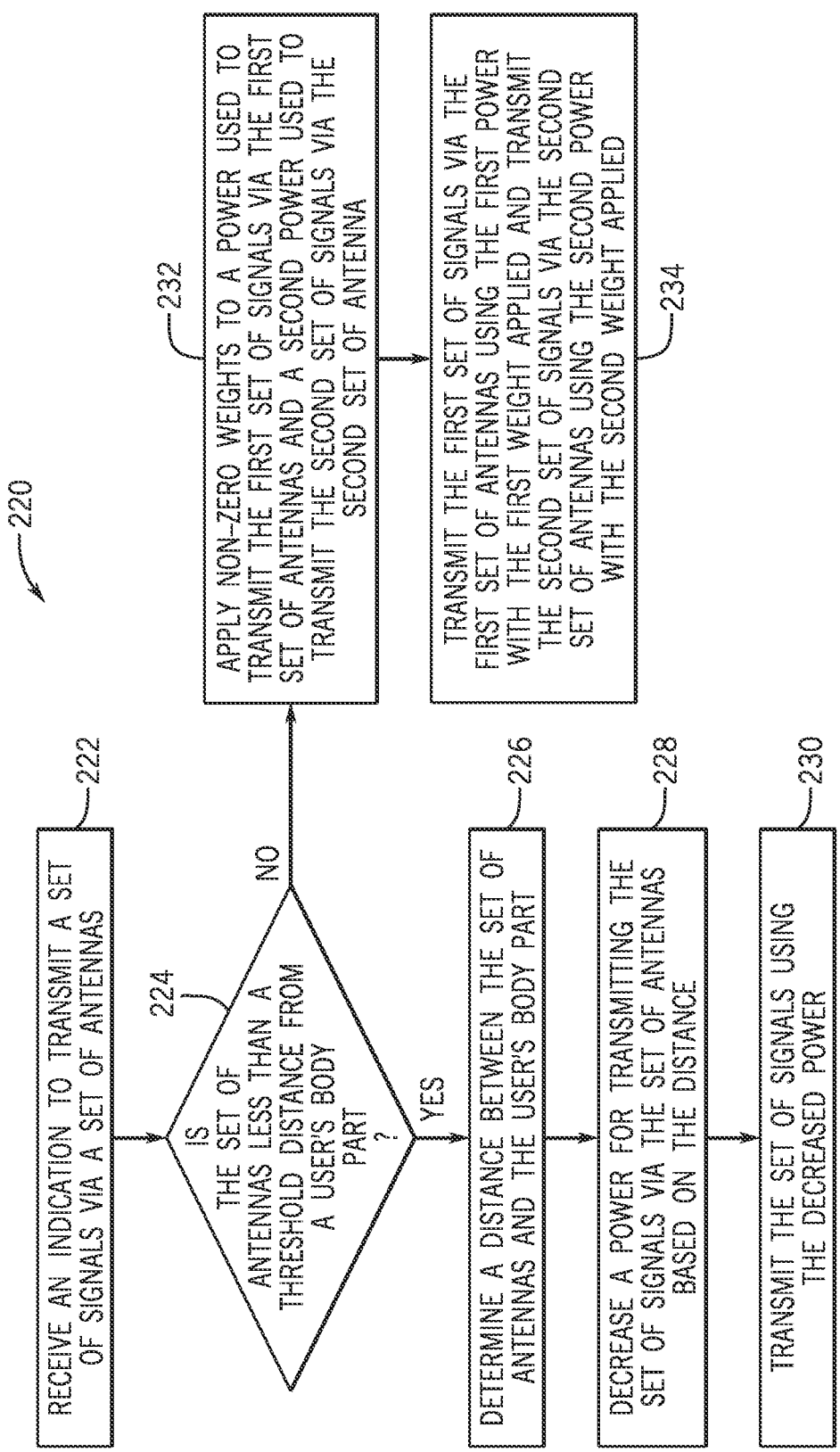
FIG. 13 is a flowchart illustrating a method of decreasing transmission power at a set of antennas based on a threshold distance between the handheld device and a body part, according to embodiments of the present disclosure.

To illustrate, FIG. 13 is a flowchart illustrating a method 220 of decreasing transmission power at a set of antennas and increasing transmission power at another set of antennas for transmitting signals based on a threshold distance between the electronic device 10 and a body part (e.g., oriented at a body position) of a user, according to embodiments of the present disclosure. At process block 222, the processor 12 may receive an indication to transmit the set of signals via a set of antennas. That is, the processor 12 may receive an indication to transmit signals from one or more antennas 55 over a communication standard, such as LTE, 5G NR, Bluetooth, Wi-Fi, and so forth.

At process block 224, the processor 12 may determine whether the first set of antennas is less than a threshold distance from the body part 116 and/or directed to the body part 116, as discussed with respect to FIG. 8. That is, the processor 12 may determine whether the electronic device 10 is in the body position based on a predetermined distance between the set of antennas and the particular body part 116. Specifically, the threshold distance may be a distance in which the set of antennas should not radiate energy due to absorption by the body part 116, such that no energy or approximately no energy is radiated from the set of antennas. As previously discussed, the set of antennas may include an antenna array 100 of FIG. 5 that transmits signals over the mmWave frequency and is disposed on an top portion 103A and/or front side of the electronic device 10. The set of antennas of an antenna array 100 may likely be positioned in the body position when the user has the electronic device 10 at or near an ear, such as to make a phone call. To detect the distance between the set of antennas and the body part 116 and/or the direction towards the body part 116, the electronic device 10 may include one or more sensors (e.g., at least one sensor in proximity to each antenna 55 of the set of antennas), which may be integrated with the transceiver 30. The sensors may include, but are not limited to, one or more of proximity sensors, camera sensors, heat sensors, light sensors, facial and/or body recognition sensors with image processing circuitry, and the like.

As discussed with respect to the set of antennas and the head of FIG. 12, irrespective of whether or not the set of antennas is collocated with another set of antennas, the processor 12 may adjust the power at the set of antennas that is not within the threshold distance from the body part 116 and/or directed to the body part 116 (e.g., beam direction of the beamformed signal) if the set of antennas are positioned less than the threshold distance from the body part. Thus, the method 220 also applies to when the set of antennas are collocated or not collocated with another set of antennas.

At process block 226, the processor 12 may determine the distance between the set of antennas and the body part 116.

In particular, the processor 12 may use sensor data from the one or more sensors to detect and determine that the body part 116 is proximate to the set of antennas and above or below the threshold distance. At block 228, the processor 12 may decrease a power for transmitting the set of signals via the set of antennas based on the distance. That is, the processor 12 may adjust the power correspondingly or correlating to the distance. In particular, the processor 12 may decrease the power from the set of antennas as the distance between the set of antennas and the body part 116 decreases. On the other hand, if the distance between the set of antennas and the body part 116 increases, indicating that the electronic device 10 is moving further away from the body part 116, the processor 12 may correspondingly increase the power while maintaining the total ratio summation of 1.0. For example, when the electronic device 10 is moving closer to a body part 116, the processor 12 may decrease the transmission power from the set of antennas. The processor 12 may begin monitoring the distance between the set of antennas and the body part 116 in response to the set of antennas being positioned at a predetermined initial separation distance, D0 centimeters (cm). As the electronic device 10 continues moving closer to the body part 116, the separation distance becomes smaller until it reaches a first separation distance, D1, in which D1 is less than D0. By way of example, the processor 12 may decrease the transmission power for the first set of antennas at the D0 by X dB. The first power may remain at this power level until the separation distance reaches D1.

When the electronic device 10 moves closer and the separation distance between the set of antennas and the body part 116 is less than D1, the processor 12 may further decrease the transmission power by Y dB, in which the reduction power level of Y dB is greater than the reduction power level of X dB, which is greater than 0 (e.g., Y>X>0). Thus, the processor 12 decreases the power in two-phases. However, the system and methods described herein may apply to one or more phases of power reduction (e.g., one, three, five, ten, and so forth). Moreover, the processor 12 may decrease the power less or have a smaller reduction level when the device is further away from the user (i.e. the separation distance is in between D1 and D0). In some embodiments, the separation distance between D0 and D1, and additional separation phases, may vary. That is, the separation distance and the point at which the processor 12 may perform the power reduction may be shorter separation distances and/or have higher power reductions closer to the body part 116. In general, the smaller power reduction may correspond to better performance from the set of antennas, and thus the user may receive better communication service by a difference of Y-X dB (e.g., ΔY-X).

At block 230, the processor 12 may transmit the set of signals using the decreased power. That is, the processor 12 may cause the transceiver 30 to increase or decrease power at the set of antennas corresponding and with respect to the distance between the set of antennas and the body part 116. If the set of antennas is more than the threshold distance from the body part 116, the processor 12 may perform process blocks 232 and 234 that correspond to process blocks 170 and 172, as discussed with respect to FIG. 10. That is, the processor 12 may apply non-zero weights to a first power and a second power to transmit the first set of signals and the second set of signals when transmitting the first set of signals and the second set of signals from the collocated sets of antennas. In some embodiments, the sets of antennas may not be collocated and as such, the processor 12 may perform process blocks 166 and 168, as discussed with respect to FIG. 10. In this manner, the electronic device 10 may continue transmitting the set of signals and decrease the power at the set of antennas transmitting the set of signals when the set of antennas are in the body part position while reducing possible body part absorption.

Figure 14:
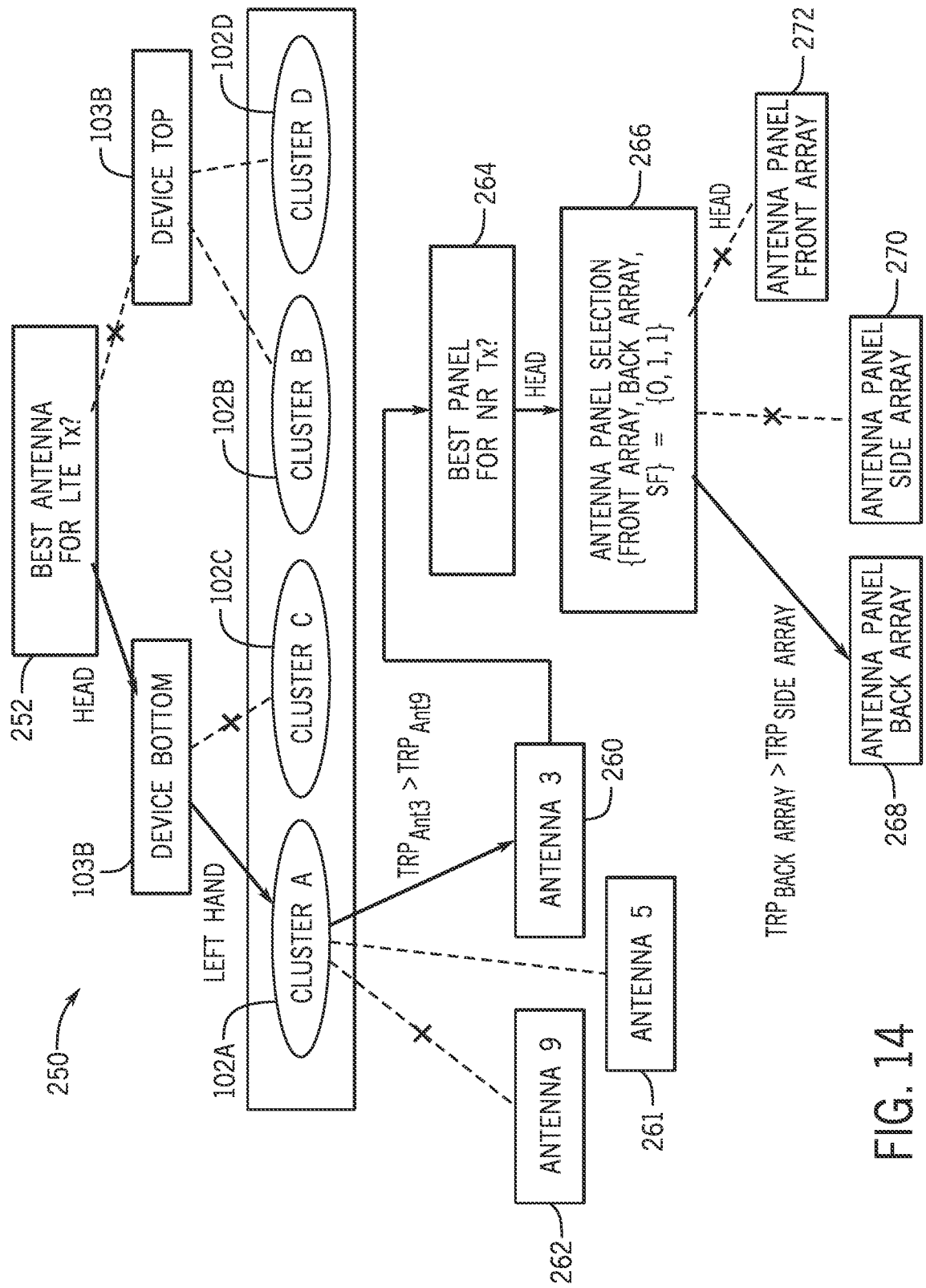
FIG. 14 is a flowchart illustrating a method of selecting an antenna of a cluster and/or an antenna array based on the methods of FIGS. 10-13, according to embodiments of the present disclosure.

To summarize the transmission power management systems and methods described herein, FIG. 14 is a flowchart illustrating a method 250 for selecting an antenna of a cluster 102 and/or an antenna array 100 based on the methods of FIGS. 9-12, according to embodiments of the present disclosure. As previously discussed, the electronic device 10 may include multiple sets of antennas, such as the antenna arrays 100 and/or the antenna clusters 102, that are disposed at different portions of the electronic device 10 and may transmit wireless signals over different frequencies. For example, the antennas 55 of the antenna arrays 100 may transmit wireless signals over mmWave frequencies while the antennas 55 of the antenna clusters 102 may transmit wireless signals over LTE frequencies. In the depicted embodiment, a user is making a call using a left hand to hold a left bottom corner of the electronic device 10 while not touching the right bottom corner. Moreover, the electronic device 10 is held against a head of the user.

With respect to the SAR and/or the MPE of the wireless signals, the location of each of the antennas 55 within the electronic device 10 (e.g., top portion 103A or bottom portion 103B of the electronic device 10, front or back of the electronic device 10, etc.) may increase the likelihood of signal absorption and collocation of antennas 55 transmitting at different frequencies. As shown, at process block 252, the processor 12 may determine the best antenna 55 for LTE transmission. When selecting one or more of the antennas 55 for the LTE transmission, the processor 12 may determine whether to select a lower antenna 55 disposed at a lower or bottom portion 103B of the electronic device 10 or select an upper antenna 55 disposed at an upper or top portion 103A of the electronic device 10. To do so, the processor 12 may determine whether or not the sets of antennas are oriented in a head position (e.g., located within a threshold distance from a head and/or in the direction of a head) as discussed with respect to FIG. 12. In the depicted embodiment, the processor 12 determines that the available antennas 55 are in a head position and thus, determines that the best antenna 55 for the LTE transmission is disposed at the lower or bottom portion 103B of the electronic device 10. Specifically, the antennas 55 disposed at the upper or top portion 103A of the electronic device 10 are closer to the head when the user uses the electronic device 10 to make the phone call. As such, the antennas 55 disposed at the top portion 103A of the electronic device 10 may not be the best antennas 55 for the LTE transmission, for example, to comply with FCC guidelines based on SAR for the LTE frequency.

Moreover, the antennas 55 may be grouped into the antenna arrays 100 of FIG. 5 and the clusters 102 of FIG. 6. As discussed with respect to FIG. 5, the antenna arrays 100 are disposed at the top portion 103A of the electronic device 10. Since the processor 12 determines that the best antenna 55 for the LTE transmission is disposed at the bottom portion 103B due to the head position, the processor 12 may select one of the antenna clusters 102 disposed at the bottom portion 103B. As discussed with respect to FIG. 6, the electronic device 10 may include Cluster A 102A, Cluster C 102B, Cluster B 102C, and Cluster D 102D. Cluster A 102A and Cluster C 102C are disposed at the bottom portion 103B of the electronic device 10.

The processor 12 may select Cluster A 102A based on a determination that the user is holding the electronic device 10 in the left hand, blocking one or more antennas 55 of the antenna Cluster C 102C disposed at the left side of the electronic device 10. Within Cluster A 102A, the processor 12 may select between a third antenna 260 (antenna 3), a fifth antenna 261 (antenna 5), and a ninth antenna 262 (antenna 9). The processor 12 may select the third antenna 260 based on a determination that a total radiated power (TRP) from the third antenna 260 is greater than the total radiated power from the fifth antenna 261 or the ninth antenna 262. Generally, the TRP may a measure how much power is radiated by an antenna 55 when the antenna 55 is connected to a radio (or transmitter of the transceiver 30). Moreover, the processor 12 may use one or more selection rules when selecting the antenna 55. For example, the selection rules may include that a single antenna 55 may not transmit two inter-band signals at the same time. Another selection rule may be that no more than one antenna 55 of an antenna cluster 102 may transmit at the same time.

After determining the best antenna 55 for the LTE transmission, the processor 12 may determine the best antenna array 100 for simultaneous or concurrent NR transmission at process block 264. At process block 266, the processor 12 may also apply weights between 0 and 1 to antenna arrays 100 based on the determination that the antennas 55 are in the head position. Specifically, since the front antenna array 272 (e.g., the first antenna array 100A of FIG. 5) of is in the head position, the head may likely absorb radiated power from the front antenna array 272 disposed at the front of the electronic device 10. Thus, the processor 12 may apply a 0 weight for the front antenna array 272. The processor 12 may apply 1 weights to the back side antenna array 268 (e.g., the second antenna array 100B of FIG. 5) and the side antenna array 270 (e.g., the third antenna array 100C of FIG. 5). Based on one or more factors, the processor may remove the front antenna array 272 from the selection of the best antenna 55 for the NR transmission, as more specifically described in FIG. 12. Specifically, the factors may include, but are not limited to, user exposure position, hotspot collocation, antenna location within the electronic device 10, radio configuration (e.g. single transmission, inter or intra transmission, etc.).

The processor 12 may determine that the TRP from the back side antenna array 268 is higher than the TRP of the side antenna array 270 and thus, select the back side antenna array 268 as the best array for NR transmission. Thus, the systems and methods described herein enable efficiently and precisely managing power (e.g., adjusting or decreasing) at antennas 55 simultaneously transmitting wireless signals at different frequencies while complying with FCC guidelines for the frequencies (e.g., the SAR and/or MPE for the frequencies).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method comprising:
receiving an indication to transmit a first set of signals within a first frequency range using a first standard via a first plurality of antennas of a radio frequency device and a second set of signals within a second frequency range using a second standard via a second plurality of antennas, the first frequency range not overlapping with the second frequency range;
determining a first power by applying a first weight to a first initial power associated with the first plurality of antennas to maintain a total ratio summation of radiation from the first set of signals and the second set of signals;
transmitting the first set of signals within the first frequency range via the first plurality of antennas using the first power with the first weight applied based on exposure conditions of the first set of signals and the second set of signals;
determining a second power by applying a second weight to a second initial power associated with the second plurality of antennas to maintain the total ratio summation of radiation from the first set of signals and the second set of signals; and
transmitting the second set of signals within the second frequency range via the second plurality of antennas using the second power with the second weight applied based on the exposure conditions of the first set of signals and the second set of signals.

2. The method of claim 1, wherein the first standard comprises a Long Term Evolution (LTE) standard and the second standard comprises a New Radio (NR) standard.

3. The method of claim 1, comprising:
receiving an indication to transmit a third set of signals using a third standard via a third plurality of antennas of the radio frequency device; and
transmitting the third set of signals via the third plurality of antennas using a third power based on the exposure conditions of the first set of signals and the second set of signals and an exposure condition of the third set of signals.

4. The method of claim 3, wherein transmitting the first set of signals, transmitting the second set of signals, and transmitting the third set of signals occurs concurrently.

5. The method of claim 1, comprising determining the first power and the second power based on the exposure conditions using at least one of a maximum permissible exposure (MPE) or a specific absorption rate (SAR) value.

6. The method of claim 1, comprising:
determining that the first plurality of antennas or the second plurality of antennas are below a threshold distance from a head of a user;
in response to determining that the first plurality of antennas is below the threshold distance from the head of the user, disabling transmission of the first set of signals via the first plurality of antennas; and
in response to determining that the second plurality of antennas is below the threshold distance from the head of the user, disabling transmission of the second set of signals via the second plurality of antennas.

7. The method of claim 1, comprising:
determining that the first plurality of antennas are less than a threshold distance from a head of a user;

determining a third plurality of antennas are above the threshold distance from the head of the user;
deactivating the first plurality of antennas; and
transmitting the first set of signals via at least one antenna of the third plurality of antennas.

8. The method of claim 1, comprising:
disabling transmission of the first set of signals via the first plurality of antennas in response to determining the first plurality of antennas are obstructed; and
identifying a third plurality of antennas to use for transmitting within the first frequency range.

9. The method of claim 8, comprising transmitting the first set of signals within the first frequency range via one or more antennas of the third plurality of antennas.

10. A radio frequency device comprising:
a first plurality of antennas and a second plurality of antennas;
a first transmitter configured to send transmission signals via the first plurality of antennas using a first standard;
a second transmitter configured to send transmission signals via the second plurality of antennas using a second standard different from the first standard; and
one or more processors communicatively coupled to the first transmitter and the second transmitter, the one or more processors configured to:
receive an indication to transmit a first set of signals via the first plurality of antennas within a first frequency range using the first standard and a second set of signals via the second plurality of antennas within a second frequency range using the second standard, the first frequency range not overlapping with the second frequency range;
cause the first transmitter to transmit the first set of signals via the first plurality of antennas within the first frequency range using a first power by applying a first weight to a first initial power associated with the first plurality of antennas to determine the first power, wherein the first weight is based on a proximity of the first plurality of antennas to the second plurality of antennas, a first exposure condition associated with the first set of signals and a second exposure condition associated with the second set of signals, or a first priority of the first set of signals and a second priority of the second set of signals; and
cause the second transmitter to transmit the second set of signals via the second plurality of antennas within the second frequency range using a second power by applying a second weight to a second initial power associated with the second plurality of antennas to determine the second power, wherein the second weight is based on the proximity of the first plurality of antennas to the second plurality of antennas, the first exposure condition associated with the first set of signals and the second exposure condition associated with the second set of signals, or the first priority of the first set of signals and the second priority of the second set of signals.

11. The radio frequency device of claim 10, wherein the one or more processors are configured to determine a first distance between the first set of antennas and a human.

12. The radio frequency device of claim 11, wherein the one or more processors are configured to decrease the first power based at least on the first distance being below a threshold distance.

13. The radio frequency device of claim 12, wherein the one or more processors are configured to determine a second distance between the second set of antennas and the human.

14. The radio frequency device of claim 13, wherein the one or more processors are configured to decrease the second power based at least on the second distance being below the threshold distance.

15. The radio frequency device of claim 14, wherein the first set of signals have a higher priority than the second set of signals, the one or more processors are configured to decrease the first power to a first decreased power based at least on the first distance being below the threshold distance and decrease the second power to a second decreased power based at least on the second distance being below the threshold distance, and the first decreased power is greater than the second decreased power.

16. The radio frequency device of claim 10, wherein the first weight or the second weight comprises a value between 0 and 1.

17. A mobile communication device, comprising:
a mobile communication device enclosure;
a first set of antennas and a second set of antennas disposed in a first portion of the enclosure;
a first transmitter configured to send transmission signals, associated with a first standard, through the first set of antennas;
a second transmitter configured to send transmission signals, associated with a second standard different from the first standard, through the second set of antennas; and
one or more processors communicatively coupled to the first transmitter and the second transmitter, the one or more processors configured to:
receive an indication to transmit a first set of signals associated with the first standard;
receive an indication to transmit a second set of signals associated with the second standard;
cause the first transmitter to transmit the first set of signals via the first set of antennas within a first frequency range using a first power by applying a first weight to a first initial power associated with the first set of antennas to determine the first power, wherein the first weight is based on a proximity of the first set of antennas to the second set of antennas, a first exposure condition associated with the first set of signals and a second exposure condition associated with the second set of signals, or a first priority of the first set of signals and a second priority of the second set of signals; and
cause the second transmitter to transmit the second set of signals via the second set of antennas within a second frequency range using a second power by applying a second weight to a second initial power associated with the second set of antennas to determine the first power, wherein the first weight is based on the proximity of the first set of antennas to the second set of antennas, the first exposure condition associated with the first set of signals and the second exposure condition associated with the second set of signals, or the first priority of the first set of signals and the second priority of the second set of signals, the first frequency range not overlapping with the second frequency range.

18. The mobile communication device of claim 17, comprising a third set of antennas disposed in a second portion of the enclosure and a third transmitter configured to send transmission signals, associated with the first standard, through the third set of antennas, the one or more processors communicatively coupled to the third transmitter.

19. The mobile communication device of claim 18, wherein the one or more processors are configured to identify an obstruction condition associated with the third set of antennas, and, in response to identifying the obstruction condition, cause the first transmitter to transmit the first set of signals via the first set of antennas within the first frequency range using the first power and cause the second transmitter to transmit the second set of signals within the second frequency range.

20. The mobile communication device of claim 18, wherein the one or more processors are configured to, in response to determining the third set of antennas is not obstructed, cause the third transmitter to transmit the first set of signals via the third set of antennas and cause the second transmitter to transmit the second set of signals based on the exposure condition of the first set of signals and the second set of signals.

\* \* \* \* \*